(12) United States Patent
Sato

(10) Patent No.: US 10,295,894 B2
(45) Date of Patent: May 21, 2019

(54) DISCHARGE LAMP DRIVER, LIGHT SOURCE APPARATUS, PROJECTOR, AND DISCHARGE LAMP DRIVING METHOD

(71) Applicant: SEIKO EPSON CORPORATION, Tokyo (JP)

(72) Inventor: Shun Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/905,136

(22) Filed: Feb. 26, 2018

(65) Prior Publication Data

US 2018/0252994 A1 Sep. 6, 2018

(30) Foreign Application Priority Data

Mar. 6, 2017 (JP) .................................. 2017-041845

(51) Int. Cl.
| | |
|---|---|
| *H05B 41/288* | (2006.01) |
| *G03B 21/20* | (2006.01) |
| *H04N 9/31* | (2006.01) |
| *G03B 33/12* | (2006.01) |
| *G03B 21/00* | (2006.01) |

(52) U.S. Cl.
CPC ..... *G03B 21/2053* (2013.01); *G03B 21/2026* (2013.01); *H04N 9/3102* (2013.01); *H04N 9/3105* (2013.01); *H04N 9/3155* (2013.01); *H05B 41/2887* (2013.01); *G03B 21/006* (2013.01); *G03B 33/12* (2013.01)

(58) Field of Classification Search
None
See application file for complete search history.

(56) References Cited

U.S. PATENT DOCUMENTS

| | | | | |
|---|---|---|---|---|
| 4,912,374 A | * | 3/1990 | Nagase .............. | H05B 41/2928 315/226 |
| 6,583,570 B1 | * | 6/2003 | Ito ........................ | B60Q 1/1415 307/10.8 |
| 6,943,503 B2 | * | 9/2005 | Ozasa ................ | H05B 41/2883 315/224 |
| 7,023,144 B2 | * | 4/2006 | Suzuki .................... | H01J 61/20 315/246 |
| 7,170,237 B2 | * | 1/2007 | Suzuki ............... | H05B 41/2888 315/246 |
| 8,008,869 B2 | | 8/2011 | Soma et al. | |
| 8,044,334 B2 | | 10/2011 | Kagata et al. | |
| 8,269,424 B2 | | 9/2012 | Terashima | |

(Continued)

*Primary Examiner* — Crystal L Hammond
(74) *Attorney, Agent, or Firm* — Oliff PLC

(57) ABSTRACT

In a discharge lamp driver, a control section is configured to alternately repeat a first period in which an AC current is supplied and a second period in which a DC current is supplied, and when a first drive power lower than a rated power of the discharge lamp is supplied and an accumulated lighting time of the discharge lamp is shorter than a predetermined time, the control section is configured to set the length of the first period to be greater than that in a case where the first drive power is supplied and the accumulated lighting time is equal to or longer than the predetermined time, and set the frequency of the AC current during the first period to be higher than that in the case where the first drive power is supplied and the accumulated lighting time is equal to or longer than the predetermined time.

13 Claims, 13 Drawing Sheets

(56) References Cited

U.S. PATENT DOCUMENTS

| | | | |
|---|---|---|---|
| 8,513,893 B2 | 8/2013 | Ono et al. | |
| 8,547,038 B2 * | 10/2013 | Saka | G03B 21/2026 |
| | | | 315/225 |
| 9,785,041 B2 | 10/2017 | Sato et al. | |
| 2005/0206326 A1 * | 9/2005 | Suzuki | H01J 61/20 |
| | | | 315/246 |
| 2008/0116820 A1 * | 5/2008 | Ozasa | H05B 41/2928 |
| | | | 315/246 |
| 2009/0153073 A1 * | 6/2009 | Yamauchi | G03B 21/00 |
| | | | 315/291 |
| 2009/0237624 A1 | 9/2009 | Soma et al. | |
| 2010/0127631 A1 * | 5/2010 | Okamoto | H05B 41/2888 |
| | | | 315/246 |
| 2010/0128232 A1 * | 5/2010 | Kagata | H05B 41/2885 |
| | | | 353/85 |
| 2011/0012524 A1 * | 1/2011 | Terashima | H05B 41/2883 |
| | | | 315/246 |
| 2011/0012525 A1 | 1/2011 | Terashima | |
| 2011/0128508 A1 * | 6/2011 | Yamada | H05B 41/2883 |
| | | | 353/85 |
| 2012/0074858 A1 | 3/2012 | Ono et al. | |
| 2013/0088693 A1 * | 4/2013 | Terashima | G09G 3/20 |
| | | | 353/85 |
| 2014/0085614 A1 | 3/2014 | Sato | |
| 2016/0320693 A1 | 11/2016 | Sato et al. | |

* cited by examiner

DISCHARGE LAMP DRIVER, LIGHT SOURCE APPARATUS, PROJECTOR, AND DISCHARGE LAMP DRIVING METHOD

BACKGROUND

1. Technical Field

The present invention relates to a discharge lamp driver, a light source apparatus, a projector, and a discharge lamp driving method.

2. Related Art

For example, JP-A-2011-124184 describes a configuration in which the frequency of AC current supplied to a high-pressure discharge lamp is switched between a first frequency and a second frequency higher than the first frequency and the AC current having the first frequency is supplied for the length of half the cycle of the AC current to the high-pressure discharge.

In an initial state of a lamp, such as the lamp described above (discharge lamp), in which the lamp is not relatively degraded, the front ends of the electrodes of the lamp each have a relatively large protrusion. In the case where the front ends of the electrodes of the lamp each have a relatively large protrusion, the positions of bright spots in arc discharge are likely to be unstable as compared with a case where the protrusion is relatively small. When rated power is supplied to the lamp, however, the bright spots in the arc discharge are relatively large, so that the positions of the bright spots in the arc discharge can be stabilized even when the front ends of the electrodes of the lamp each have a relatively large protrusion.

On the other hand, in a case where drive power lower than the rated power is supplied to the lamp, the bright spots in the arc discharge produced in the lamp become relatively small. Therefore, when drive power lower than the rated power is supplied to the lamp, and the front ends of the electrodes of the lamp each have a relatively large protrusion, the positions of the bright spots in the arc discharge are likely to be unstable. However, even when drive power lower than the rated power is supplied to the lamp, but an accumulated lighting time for which the lamp is kept turned on is relatively long, the protrusions of the front ends of the electrodes of the lamp are likely to melt, so that relatively small protrusions according to the relatively small bright spots in the arc discharge are quickly formed at the front ends of the protrusions, whereby the positions of the bright spots in the arc discharge can be stabilized.

As described above, when the rated power is supplied to the lamp even in the initial state of the lamp, or when the accumulated lighting time of the lamp is relatively long even when drive power lower than the rated power is supplied to the lamp, the positions of the bright spots in the arc discharge can be stabilized. When drive power lower than the rated power is supplied to the lamp in the initial state, however, the protrusions at the front ends of the electrodes of the lamp are unlikely to melt, so that a relatively small protrusion is unlikely to be formed at the front end of the protrusion, and the relatively small bright spots in the arc discharge are likely to move over the relatively large protrusions at the front ends of the electrodes. As a result, the positions of the bright spots in the arc discharge are likely to be unstable. Therefore, when drive power lower than the rated power is supplied to the lamp in the initial state, the lamp undesirably flickers in some cases.

SUMMARY

An advantage of some aspects of the invention is to provide a discharge lamp driver capable of preventing a discharge lamp from flickering even when drive power lower than rated power is supplied to the discharge lamp in its initial state, a light source apparatus including the discharge lamp driver, and a projector including the light source apparatus. Another advantage of some aspects of the invention is to provide a discharge lamp driving method capable of preventing a discharge lamp from flickering even when drive power lower than rated power is supplied to the discharge lamp in its initial state.

A discharge lamp driver according to an aspect of the invention includes a discharge lamp driving section configured to supply drive current to a discharge lamp including a first electrode and a second electrode and a control section configured to control the discharge lamp driving section. The control section is configured to alternately repeat a first period in which an AC current is supplied to the discharge lamp and a second period in which a DC current is supplied to the discharge lamp. In a case where a first drive power lower than a rated power of the discharge lamp is supplied to the discharge lamp and an accumulated lighting time of the discharge lamp is shorter than a predetermined time, the control section is configured to set a length of the first period to be greater than the length of the first period in a case where the first drive power is supplied to the discharge lamp and the accumulated lighting time is equal to or longer than the predetermined time, and is configured to set a frequency of the AC current during the first period to be higher than the frequency of the AC current during the first period in the case where the first drive power is supplied to the discharge lamp and the accumulated lighting time is equal to or longer than the predetermined time.

In the discharge lamp driver according to the aspect of the invention, the control section increases the length of the first period and the frequency of the AC current during the first period in an initial state in which the drive power is the first drive power and the accumulated lighting time is shorter than the predetermined time. Only part of the protrusions at the front ends of the electrodes is therefore allowed to melt and solidify for growth with the positions of the bright spots stabilized. As a result, in the initial state of the discharge lamp, elongated small protrusions can be quickly formed at the front ends of the protrusions. The formation of the small protrusions allows the bright spots in the arc discharge to be stabilized in the positions of the front ends of the small protrusions, preventing the bright spots from moving. The discharge lamp driver according to the aspect of the invention can therefore prevent the discharge lamp from flickering even in the case where the first drive power, which is lower than the rated power, is supplied to the discharge lamp in the initial state of the discharge lamp.

The control section may set the length of the first period to be a constant value, in the case where the first drive power is supplied to the discharge lamp and the accumulated lighting time is shorter than the predetermined time.

According to the configuration described above, the range over which the protrusions at the front ends of the electrodes melt is likely to narrow as compared with a case where the length of the first period changes, whereby the small protrusions are likely to be formed more quickly. The flicker of the discharge lamp can therefore be more preferably avoided.

In the case where the first drive power is supplied to the discharge lamp and the accumulated lighting time is shorter than the predetermined time, the control section may set a length of the second period to be shorter than the length of the second period in the case where the first drive power is supplied to the discharge lamp and the accumulated lighting time is equal to or longer than the predetermined time.

According to the configuration described above, the thermal load applied to the first electrode and the second electrode can be adequately reduced, whereby the range over which the protrusions at the front ends of the electrodes melt can be narrowed. The small protrusions are therefore likely to be formed more quickly. The flicker of the discharge lamp can therefore be more preferably avoided.

The control section may set a length of the second period to be a constant value, in the case where the first drive power is supplied to the discharge lamp and the accumulated lighting time is shorter than the predetermined time.

According to the configuration described above, the range over which the protrusions at the front ends of the electrodes melt are likely to narrow as compared with a case where the length of the second period changes, whereby the small protrusions are likely to be formed more quickly. The flicker of the discharge lamp can therefore be more preferably avoided.

In the case where the first drive power is supplied to the discharge lamp and the accumulated lighting time is shorter than the predetermined time, the control section may set the length of the first period to be greater than the length of the first period in a case where the rated power is supplied to the discharge lamp.

According to the configuration described above, the bright spots are likely to be more stabilized, and the small protrusions are likely to be formed quickly. The flicker of the discharge lamp can therefore be more preferably avoided.

In the case where the first drive power is supplied to the discharge lamp and the accumulated lighting time is shorter than the predetermined time, the control section may set a length of the second period to be shorter than the length of the second period in a case where the rated power is supplied to the discharge lamp.

According to the configuration described above, the thermal load applied to the first electrode and the second electrode can be adequately reduced, whereby the range over which the protrusions at the front ends of the electrodes melt can be narrowed. As a result, the small protrusions are likely to be formed more quickly, whereby the flicker of the discharge lamp can be more preferably avoided.

A light source apparatus according to another aspect of the invention includes a discharge lamp configured to emit light and the discharge lamp driver described above.

The light source apparatus according to the aspect of the invention, which includes the discharge lamp driver described above, can prevent the discharge lamp from flickering even in the case where the first drive power, which is lower than the rated power, is supplied to the discharge lamp in the initial state of the discharge lamp.

A projector according to another aspect of the invention includes the light source apparatus described above, a light modulator configured to modulate light outputted from the light source apparatus in accordance with an image signal, and a projection system configured to project the light modulated by the light modulator.

The projector according to the aspect of the invention, which includes the light source apparatus described above, can prevent the discharge lamp from flickering even in the case where the first drive power, which is lower than the rated power, is supplied to the discharge lamp in the initial state of the discharge lamp. As a result, flicker of an image projected from the projector can be avoided.

A discharge lamp driving method according to another aspect of the invention is a discharge lamp driving method for supplying drive current to a discharge lamp and driving the discharge lamp including a first electrode and a second electrode, the method including alternately repeating a first period in which an AC current is supplied to the discharge lamp and a second period in which a DC current is supplied to the discharge lamp, and in a case where a first drive power lower than a rated power of the discharge lamp is supplied to the discharge lamp and an accumulated lighting time of the discharge lamp is shorter than a predetermined time, setting a length of the first period to be greater than the length of the first period in a case where the first drive power is supplied to the discharge lamp and the accumulated lighting time is equal to or longer than the predetermined time, and setting a frequency of the AC current during the first period to be higher than the frequency of the AC current during the first period in the case where the first drive power is supplied to the discharge lamp and the accumulated lighting time is equal to or longer than the predetermined time.

The discharge lamp driving method according to the aspect of the invention can prevent the discharge lamp from flickering even in the case where the first drive power, which is lower than the rated power, is supplied to the discharge lamp in the initial state of the discharge lamp, as in the cases described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

A projector according to an embodiment of the invention will be described below with reference to the drawings.

The scope of the invention is not limited to the following embodiment and can be arbitrarily changed within the scope of the technical idea of the invention. In the following drawings, for clarity of each configuration, the scale, the number, and other factors of the structure of the configuration differ from those of an actual structure in some cases.

Figure 1:
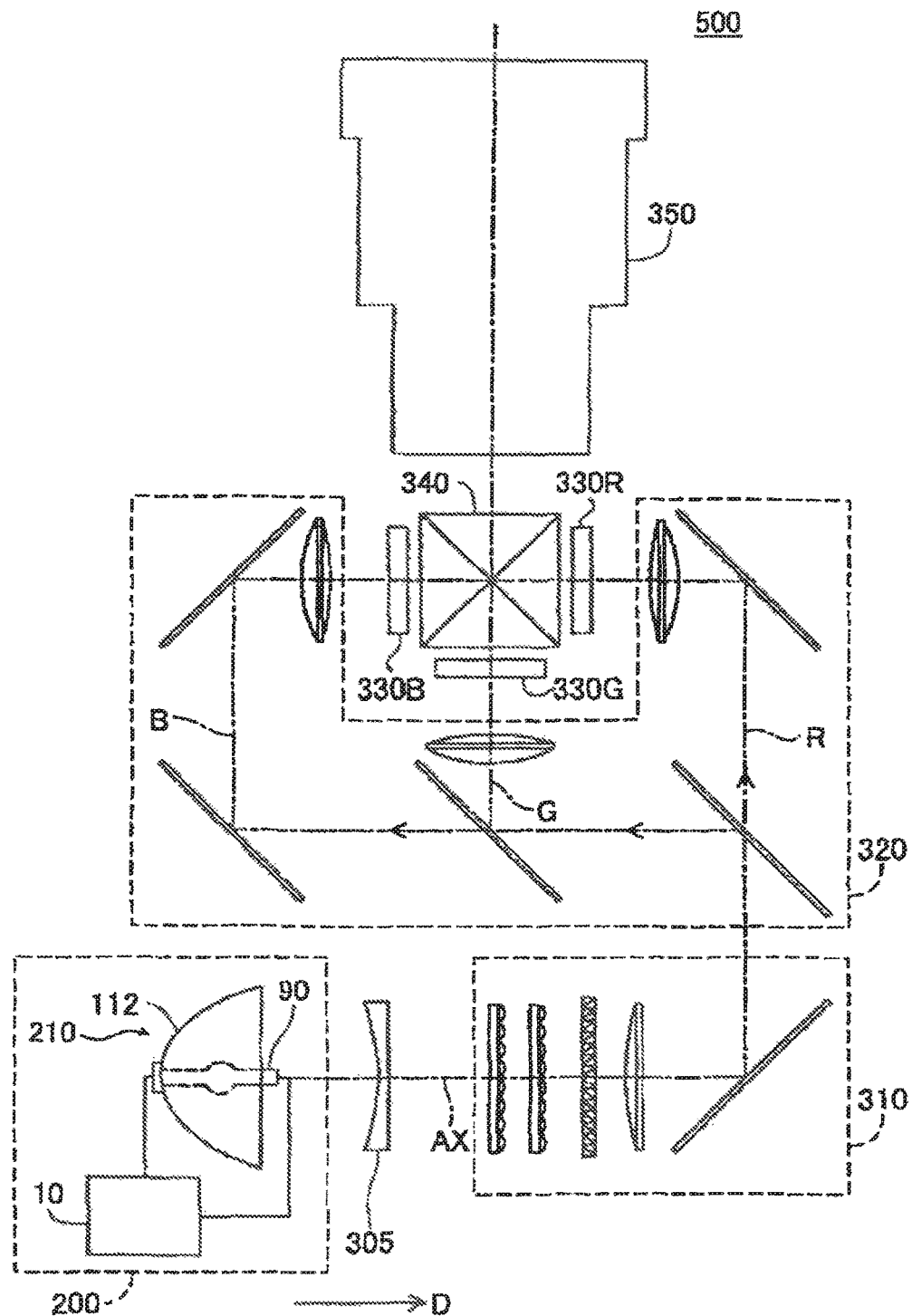
FIG. 1 is a schematic configuration diagram showing a projector according to an embodiment of the invention.

FIG. 1 is a schematic configuration diagram showing a projector 500 according to the present embodiment. The projector 500 according to the present embodiment includes a light source apparatus 200, a parallelizing lens 305, an illumination system 310, a color separation system 320, three liquid crystal light valves (light modulators) 330R, 330G, and 330B, a cross dichroic prism 340, and a projection system 350, as shown in FIG. 1.

Light outputted from the light source apparatus 200 passes through the parallelizing lens 305 and enters the illumination system 310. The parallelizing lens 305 parallelizes the light from the light source apparatus 200.

The illumination system 310 adjusts the illuminance of the light outputted from the light source apparatus 200 in such a way that the illuminance is homogenized over the liquid crystal light valves 330R, 330G, and 330B. The illumination system 310 further aligns the polarization directions of the light outputted from the light source apparatus 200 one another to form light having a single polarization direction in order to allow the liquid crystal light valves 330R, 330G, and 330B to effectively use the light outputted from, the light source apparatus 200.

The light adjusted in terms of the illumination distribution and the polarization direction enters the color separation system 320. The color separation system 320 separates the light incident thereon into three color light fluxes, red light (R), green light (G), and blue light (B). The three color light fluxes are modulated by the liquid crystal light valves 330R, 330G, and 330B, which are related to the color light fluxes, in accordance with image information. The liquid crystal light valves 330R, 330G, and 330B include liquid crystal panels 560R, 560G, and 560B, which will be described later, and polarizers (not shown). The polarizers are disposed on the light incident side and the light exiting side of the liquid crystal panels 560R, 560G, and 560B.

The three modulated color light fluxes are combined with one another by the cross dichroic prism 340. The combined light enters the projection system 350. The projection system 350 projects the light incident thereon on a screen 700 (see FIG. 3). An image is thus displayed on the screen 700. A known configuration can be employed as the configuration of each of the parallelizing lens 305, the illumination system 310, the color separation system 320, the cross dichroic prism 340, and the projection system 350.

Figure 2:
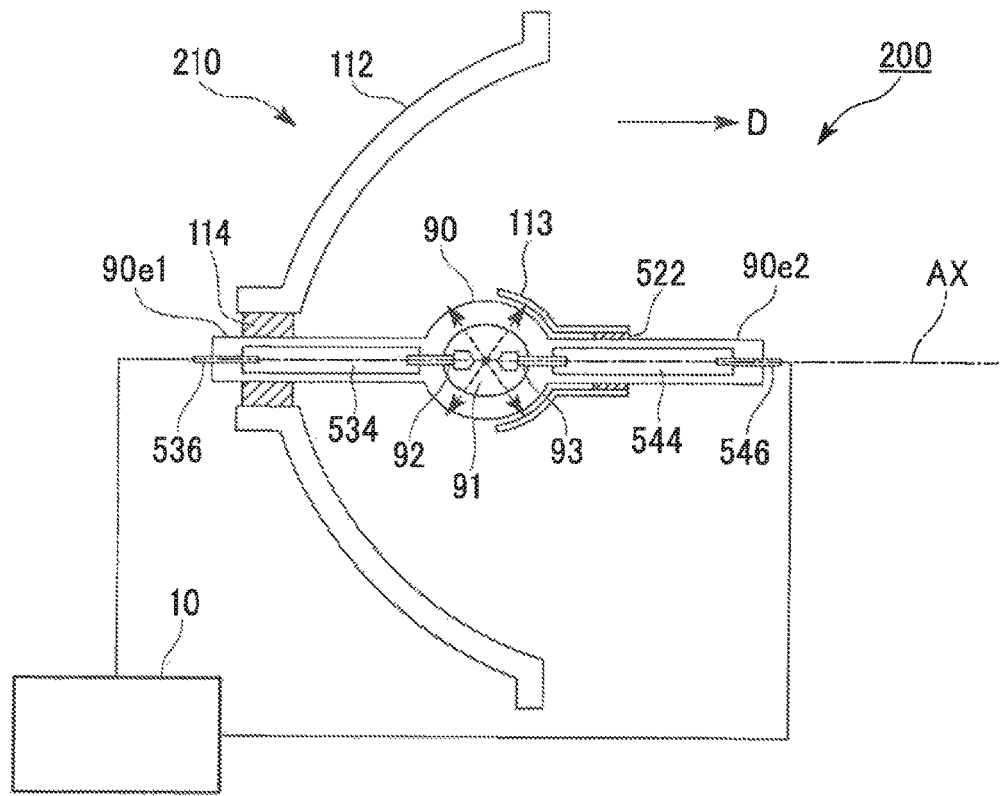
FIG. 2 shows a discharge lamp in the present embodiment.

FIG. 2 is a cross-sectional view showing the configuration of the light source apparatus 200. The light source apparatus 200 includes a light source unit 210 and a discharge lamp starter (discharge lamp driver) 10. FIG. 2 shows a cross section of the light source unit 210. The light source unit 210 includes a primary reflection mirror 112, a discharge lamp 90, and a secondary reflection mirror 113.

The discharge lamp starter 10 supplies the discharge lamp 90 with drive current I to turn on the discharge lamp 90. The primary reflection mirror 112 reflects light emitted from the discharge lamp 90 to cause the light to travel in an irradiation direction D. The irradiation direction D is parallel to the optical axis AX of the discharge lamp 90.

The discharge lamp 90 has a rod-like shape extending along the irradiation direction D. One end portion of the discharge lamp 90 is called a first end portion 90e1, and the other end portion of the discharge lamp 90 is called a second end portion 90e2. The discharge lamp 90 is made, for example, of quartz glass or any other light transmissive material. The discharge lamp 90 has a spherically swelled central portion, and a discharge space 91 is formed in the central portion. The discharge space 91 encapsulates a gas that serves as a discharge medium containing a rare gas, a metal halogen compound, and other substances.

Front ends of a first electrode 92 and a second electrode 93 protrude into the discharge space 91. The first electrode 92 is disposed in the discharge space 91 and on the side facing the first end portion 90e1. The second electrode 93 is disposed in the discharge space 91 and on the side facing the second end portion 90e2. The first electrode 92 and the second electrode 93 each have a rod-like shape extending along the optical axis AX. In the discharge space 91, electrode front end portions of the first electrode 92 and the second electrode 93 are so disposed as to face each other with a predetermined distance therebetween. The first electrode 92 and the second electrode 93 are made, for example, of tungsten or any other metal.

The first end portion 90e1 of the discharge lamp 90 is provided with a first terminal 536. The first terminal 536 is electrically connected to the first electrode 92 via an electrically conductive member 534, which passes through the interior of the discharge lamp 90. Similarly, the second end portion 90e2 of the discharge lamp 90 is provided with a second terminal 546. The second terminal 546 is electrically connected to the second electrode 93 via an electrically conductive member 544, which passes through the interior of the discharge lamp 90. The first terminal 536 and the second terminal 546 are made, for example, of tungsten or any other metal. The electrically conductive members 534 and 544 are each formed, for example, of a molybdenum foil.

The first terminal 536 and the second terminal 546 are connected to the discharge lamp starter 10. The discharge lamp starter 10 supplies the first terminal 536 and the second terminal 546 with the drive current I for driving the discharge lamp 90. As a result, arc discharge occurs between the first electrode 92 and the second electrode 93. Light produced by the arc discharge (discharge light) is omnidirectionally radiated from the discharge position, as indicated by the broken-line arrows.

The primary reflection mirror 112 is fixed to the first end portion 90e1 of the discharge lamp 30 via a fixing member 114. The primary reflection mirror 112 reflects light that is part of the discharge light and travels in the direction opposite the irradiation direction D and causes the light to travel in the irradiation direction D. The reflection surface of the primary reflection mirror 112 (surface facing discharge lamp 90) does not necessarily have a specific shape as long as the reflection surface can reflect the discharge light in the irradiation direction D and may, for example, have a spheroidal shape or a paraboloidal shape. For example, in the case where the reflection surface of the primary reflection mirror 112 has a paraboloidal shape, the primary reflection mirror 112 can convert the discharge light into light roughly parallel to the optical axis AX. In this case, the parallelizing lens 305 can be omitted.

The secondary reflection mirror 113 is fixed to the second end portion 90e2 of the discharge lamp 90 via a fixing member 522. The reflection surface of the secondary reflection mirror 113 (surface facing discharge lamp 90) has a spherical shape that surrounds a portion of the discharge space 91, the portion facing the second end portion 90e2. The secondary reflection mirror 113 reflects light that is part of the discharge light and travels toward the side opposite the side where the primary reflection mirror 112 is disposed and causes the light to travel toward the primary reflection mirror 112. The light, radiated from the discharge space 91 can thus be used at increased efficiency.

The material of the fixing members 114 and 522 is not limited to a specific material as long as they are made of a heat-resistant material that can withstand heat generated by the discharge lamp 90 and is, for example, an inorganic adhesive. A method for securely arranging the primary-reflection mirror 112, the secondary reflection mirror 113, and the discharge lamp 30 is not limited to the method for fixing the primary reflection mirror 112 and the secondary reflection mirror 113 to the discharge lamp 90 but can be any other arbitrary method. For example, the discharge lamp 90 and the primary reflection mirror 112 may independently be fixed to an enclosure (not shown) of the projector 500. The same holds true for the secondary reflection mirror 113.

The circuit configuration of the projector 500 will be described below.

Figure 3:
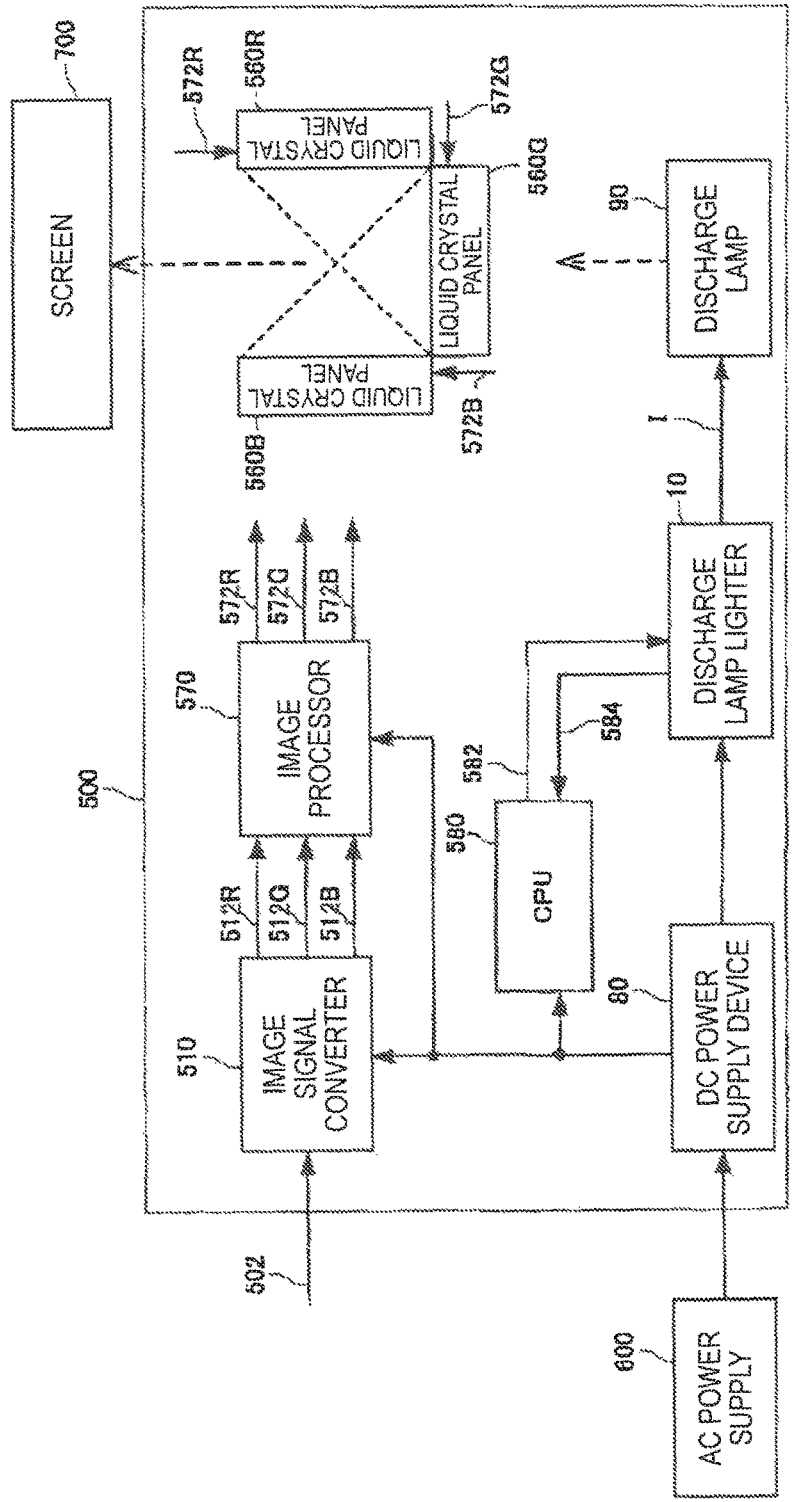
FIG. 3 is a block diagram showing a variety of components of the projector according to the present embodiment.

FIG. 3 shows an example of the circuit configuration of the projector 500 according to the present embodiment. The projector 500 includes an image signal converter 510, a DC power supply device 80, the liquid crystal panels 560R, 560G, and 560B, an image processor 570, and a CPU (central processing unit) 580 as well as the optical system shown in FIG. 1.

The image signal converter 510 converts an externally inputted image signal 502 (such as luminance-color difference signal and analog RGB signal) into a digital RGB signal having a predetermined word length to produce image signals 512R, 512G, and 512B and supplies the image processor 570 with the produced image signals.

The image processor 570 performs image processing on the three image signals 512R, 512G, and 512B. The image processor 570 supplies the liquid crystal panels 560R, 560G, and 560B with drive signals 572R, 572G, and 572B for driving the liquid crystal panels 560R, 560G, and 560B, respectively.

The DC power supply device 80 converts AC voltage supplied from an external AC power supply 600 into constant DC voltage. The DC power supply device 80 supplies the DC voltage to the image signal converter 510 and the image processor 570, which are located on the secondary side of a transformer (not shown but accommodated in DC power supply device 80), and the discharge lamp starter 10, which is located on the primary side of the transformer.

The discharge lamp starter 10 produces high voltage between the electrodes of the discharge lamp 90 when the projector 500 is activated to cause dielectric breakdown between the electrodes for formation of a discharge path. Thereafter, the discharge lamp starter 10 supplies the drive current I for allowing the discharge lamp 90 to maintain the discharge.

The liquid crystal panels 560R, 560G, and 560B are provided in the liquid crystal light valves 330R, 330G, and 330B described above, respectively. The liquid crystal panels 560R, 560G, and 560B modulate transmittance (luminance) of the color light fluxes incident via the optical system described above on the liquid crystal panels 560R, 560G, and 560B based on the drive signals 572R, 572G, and 572B, respectively.

The CPU 580 controls a variety of actions of the projector 500 from the action of turning on the projector 500 to the action of turning off the projector 500. For example, in FIG. 3, the CPU 580 outputs a turn-on command and a turn-off command carried by a communication signal 582 to the discharge lamp starter 10. The CPU 580 receives information carried by a communication signal 584 and representing whether the discharge lamp 90 has been turned on from the discharge lamp starter 10.

The configuration of the discharge lamp starter 10 will be described below.

Figure 4:
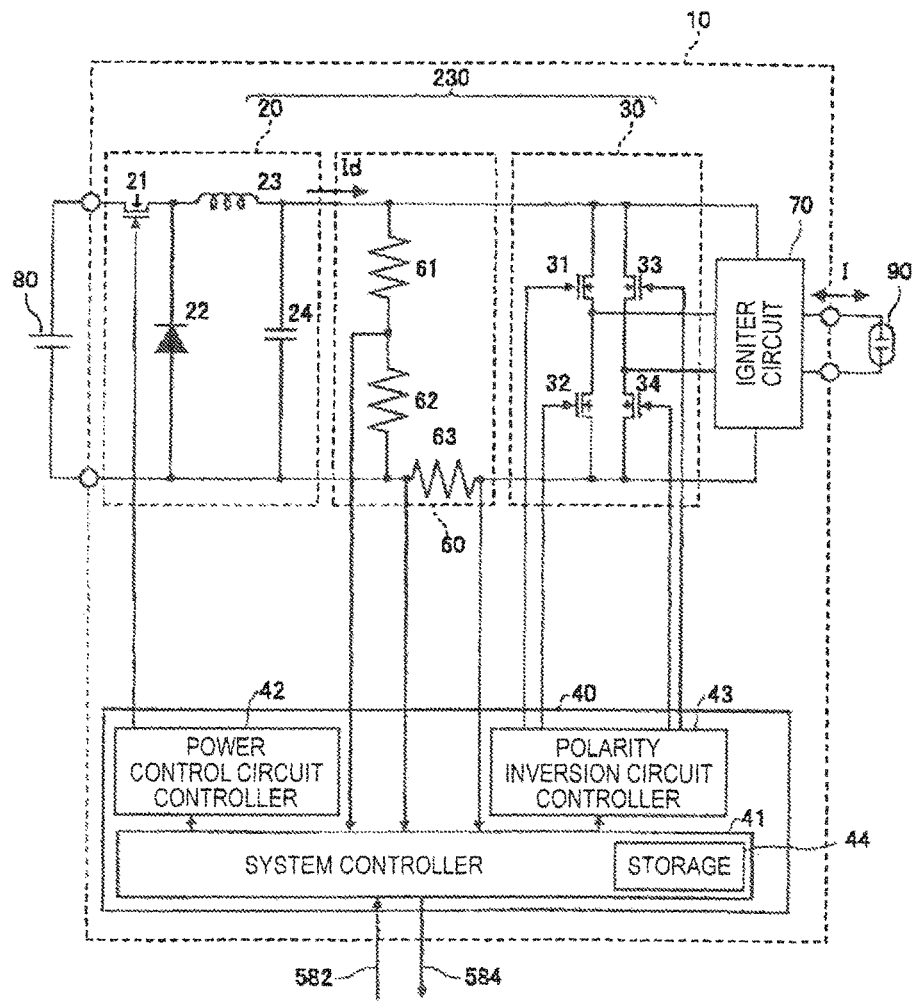
FIG. 4 is a circuit diagram of a discharge lamp starter according to the present embodiment.

FIG. 4 shows an example of the circuit configuration of the discharge lamp starter 10.

The discharge lamp starter 10 includes a power control circuit 20, a polarity inversion circuit 30, a control section 40, an action detector 60, and an igniter circuit 70, as shown in FIG. 4.

The power control circuit 20 produces drive power Wd to be supplied to the discharge lamp 90. In the present embodiment, the power control circuit 20 is formed of a down-chopper circuit that receives, as an input, voltage from the DC power supply device 80, lowers the input voltage, and outputs DC current Id.

The power control circuit 20 is formed of a switch element 21, a diode 22, a coil 23, and capacitor 24. The switch element 21 is formed, for example, of a transistor. In the present embodiment, one end of the switch element 21 is connected to the positive voltage side of the DC power supply device 80, and the other end of the switch element 21 is connected to the cathode terminal of the diode 22 and one end of the coil 23.

One end of the capacitor 24 is connected to the other end of the coil 23, and the other end of the capacitor 24 is connected to the anode terminal of the diode 22 and the negative voltage side of the DC power supply device 80. A current control signal is inputted from the control section 40, which will be described later, to the control terminal of the switch element 21 to control ON/OFF of the switch element 21. The current control signal may, for example, be a PWM (pulse width modulation) control signal.

When the switch element 21 is turned on, current flows through the coil 23, and energy is stored in the coil 23. Thereafter, when the switch element 21 is turned off, the energy stored in the coil 23 is released along the paths passing through the capacitor 24 and the diode 22. As a result, the DC current Id according to the proportion of the time period for which the switch element 21 is ON is produced.

The polarity inversion circuit 30 inverts, at a predetermined timing, the polarity of the DC current Id inputted from the power control circuit 20. The polarity inversion circuit 30 thus produces drive current I that is DC current that lasts only for a controlled time period or drive current I that is AC current having an arbitrary frequency and outputs the produced drive current I. In the present embodiment, the polarity inversion circuit 30 is formed of an inverter bridge circuit (full-bridge circuit).

The polarity inversion circuit 30 includes, for example, a first switch element 31, a second switch element 32, a third switch element 33, and a fourth switch element 34, each of which is formed, for example, of a transistor. The polarity inversion circuit 30 has a configuration in which the first switch element 31 and the second switch element 32, which are connected in aeries to each other, are connected in parallel to the third switch element 33 and the fourth switch element 34, which are connected in series to each other. Polarity inversion control signals are inputted from the control, section 40 to the control terminals of the first switch element 31, the second switch element 32, the third switch element 33, and the fourth switch element 34. The ON/OFF actions of the first switch element 31, the second switch element 32, the third switch element 33, and the fourth switch element 34 are controlled based on the polarity inversion control signals.

The polarity inversion circuit 30 alternately repeats the action of turning on and off the first switch element 31 and the fourth switch element 34 and the action of turning on and off the second switch element 32 and the third switch element 33. The polarity of the DC current Id outputted from the power control circuit 20 is thus alternately inverted. The polarity inversion circuit 30 produces drive current I that is DC current that keeps the same polarity state for a controlled time period or drive current I that is AC current having a controlled frequency and outputs the produced drive current I via a common node to which the first switch element 31 and the second switch element 32 are connected and a common node to which the third switch element 33 and the fourth switch element 34 are connected.

That is, the polarity inversion circuit 30 is so controlled that the second switch element 32 and the third switch element 33 are OFF when the first switch element 31 and the fourth switch element 34 are ON and the second switch element 32 and the third switch element 33 are ON when the first switch element 31 and the fourth switch element 34 are OFF. Therefore, when the first switch element 31 and the fourth switch element 34 are ON, the polarity inversion circuit 30 produces drive current I sequentially flowing from the one end of the capacitor 24 through the first switch element 31, the discharge lamp 90, and the fourth switch element 34. When the second switch element 32 and the third switch element 33 are ON, the polarity inversion circuit 30 produces drive current I sequentially flowing from the one end of the capacitor 24 through the third switch element 33, the discharge lamp 90, and the second switch element 32.

In the present, embodiment, the combination of the power control circuit 20 and the polarity inversion circuit 30 corresponds to a discharge lamp driving section 230. That is, the discharge lamp driving section 230 supplies the discharge lamp 90 with the drive current I for driving the discharge lamp 90.

The control section 40 controls the discharge lamp driving section 230. In the example shown in FIG. 4, the control section 40 controls the power control circuit 20 and the polarity inversion circuit 30 to control the retention time for which the drive current I keeps the same polarity, the current value of the drive current I (power value of drive power Wd), the frequency of the drive current I, and other parameters associated with the drive current I. The control section 40 performs polarity inversion control, in which the retention time for which the drive current I keeps the same polarity, the frequency of the drive current I, and other parameters thereof are controlled, on the polarity inversion circuit 30 based on the timing when the polarity of the drive current I is inverted. The control section 40 performs current control, in which the current value of the DC current Id to be outputted is controlled, on the power control circuit 20.

In the present embodiment, the control section 40 can perform AC driving, DC driving, biased driving, low-frequency AC driving, and mixed driving. The AC driving is a driving method for supplying the discharge lamp 90 with AC current. The DC driving is a driving method for supplying the discharge lamp 90 with DC current.

The biased driving is a driving method for alternately supplying the discharge lamp 90 with two types of DC current having different polarities with the length of the DC current having one of the polarities sufficiently greater than the length of the DC current having the other polarity. The low-frequency AC driving is a driving method for supplying the discharge lamp 90 with AC current having a frequency lower than the frequency of the AC current in the AC driving. The mixed driving is a driving method for alternately performing the AC driving and the DC driving. The drive current waveform of the drive current I supplied to the discharge lamp 90 in each of the discharge lamp driving methods will be described in detail in the later sections.

The control section 40 does not necessarily have a specific configuration. In the present embodiment, the control section 40 includes a system controller 41, a power control circuit controller 42, and a polarity inversion circuit controller 43. The control section 40 may be so configured that part or entirety thereof is formed of a semiconductor integrated circuit.

The system controller 41 controls the power control circuit controller 42 and the polarity inversion circuit controller 43 to control the power control circuit 20 and the polarity inversion circuit 30. The system controller 41 may control the power control circuit controller 42 and the polarity inversion circuit controller 43 based on lamp voltage (inter-electrode voltage) Vla, which is detected by the action detector 60, and the drive current I.

In the present embodiment, a storage 44 is connected to the system controller 41.

The system controller 41 may control the power control circuit 20 and the polarity inversion circuit 30 based on information stored in the storage 44. The storage 44 may store, for example, information on the retention time for which the drive current I keeps the same polarity, the current value, the frequency, the waveform, and the modulation pattern of the drive current I, and other drive parameters.

The power control circuit controller 42 controls the power control circuit 20 by output ting a current control signal to the power control circuit 20 based on a control signal from the system controller 41.

The polarity inversion circuit controller 43 controls the polarity inversion circuit 30 by outputting a polarity inversion control signal to the polarity inversion circuit 30 based on a control signal from the system controller 41.

The control section 40 can be achieved by using a dedicated circuit and configured to perform the control described above and a variety of types of control on processes described below. Instead, the control section 40 may, for example, be configured to function as a computer and perform a variety of types of control on the processes by causing a CPU to execute a control program stored in the storage 44.

Figure 5:
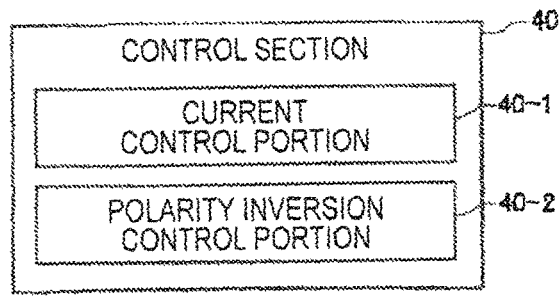
FIG. 5 is a block diagram showing an example of the configuration of a control section in the present embodiment.

FIG. 5 describes another example of the configuration of the control section 40. The control section 40 may be configured to function as a current control portion 40-1, which controls the power control circuit 20, and a polarity inversion control portion 40-2, which controls the polarity inversion circuit 30, by using a control program, as shown in FIG. 5.

In the example shown in FIG. 4, the control section 40 is configured as part of the discharge lamp starter 10. Instead, the CPU 580 may be responsible for part of the functions of the control section 40.

In the present embodiment, the action detector 60 includes a voltage detector that detects the lamp voltage Vla across the discharge lamp 90 and outputs lamp voltage information to the control section 40. The action detector 60 may further include, for example, a current detector that detects the drive current I and outputs drive current information to the control section 40. In the present embodiment, the action detector 60 includes a first resistor 61, a second resistor 62, and a third resistor 63.

In the present embodiment, the voltage detector of the action detector 60 detects the lamp voltage Vla based on divided voltage values across the first resistor 61 and the second resistor 62, which are connected in parallel to the discharge lamp 90 and connected in series to each other. Further, in the present embodiment, the current detector detects the drive current I based on the voltage across the third resistor 63, which is connected in series to discharge lamp 90.

The igniter circuit 70 operates only when the discharge lamp 90 is turned on. The igniter circuit 70 supplies the space between the electrodes (between first electrode 92 and second electrode 93) of the discharge lamp 90 with high voltage (voltage higher than voltage in normal lighting period of discharge lamp 90) necessary for dielectric breakdown between the electrodes (between first electrode 92 and second electrode 93) of the discharge lamp 90 followed by formation of the discharge path at the start of ignition of the discharge lamp 90. In the present embodiment, the igniter circuit 70 is connected in parallel to the discharge lamp 90.

Figure 6A:
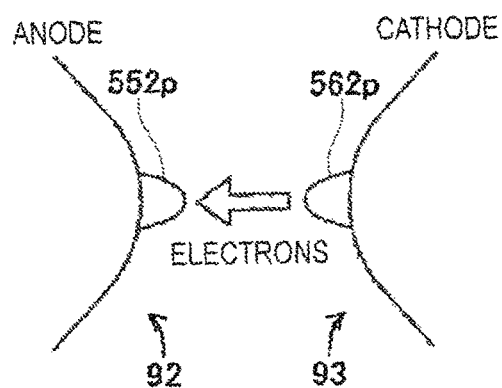
FIG. 6A shows the state of protrusions at the front ends of the electrodes of the discharge lamp.
Figure 6B:
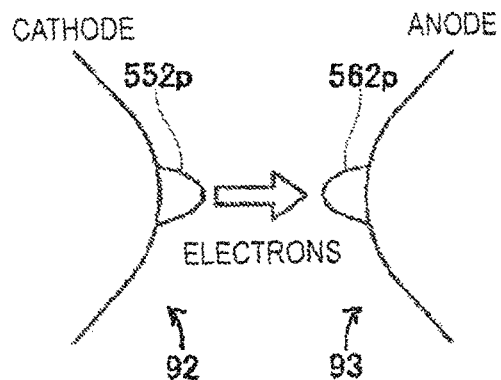
FIG. 6B shows the state of the protrusions at the front ends of the electrodes of the discharge lamp.

FIGS. 6A and 6B show front end portions of the first electrode 92 and the second electrode 93. Protrusions 552$p$ and 562$p$ are formed at the front ends of the first electrode 92 and the second electrode 93, respectively. FIG. 6A shows a first polarity state in which the first electrode 92 operates as the anode and the second electrode 93 operates as the cathode. In the first polarity state, when the discharge occurs, electrons move from the second electrode 93 (cathode) to the first electrode 92 (anode). The cathode (second electrode 93) emits the electrons. The electrons emitted from the cathode (second electrode 93) collide with the front end of the anode (first electrode 92). The collision generates heat, which raises the temperature of the front end (protrusion 552$p$) of the anode (first electrode 92).

FIG. 6B shows a second polarity state in which the first electrode 92 operates as the cathode and the second electrode 93 operates as the anode. In the second polarity state, the electrons move from the first electrode 92 to the second electrode 93, which is the converse of the first polarity state. As a result, the temperature of the front end (protrusion 562$p$) of the second electrode 93 rises.

As described above, when the drive current I is supplied to the discharge lamp 90, the temperature of the anode with which the electrons collide rises. On the other hand, the temperature of the cathode, which emits the electrons, lowers during the period for which the cathode emits the electrons toward the anode.

The inter-electrode distance between the first electrode 92 and the second electrode 93 increases as the protrusions 552$p$ and 562$p$ are degraded. The reason for this is that the protrusions 552$p$ and 562$p$ waste. When the inter-electrode distance increases, the resistance between the first electrode 92 and the second electrode 93 increases, resulting in an increase in the lamp voltage Vla. Referring to the lamp voltage Vla therefore allows detection of a change in the inter-electrode distance, that is, the degree of degradation of the discharge lamp 90.

Since the first electrode 92 and the second electrode 93 have the same configuration, the following description will be made only of the first electrode 92 as a representative electrode in some cases. Further, since the protrusion 552$p$ at the front end of the first electrode 92 and the protrusion 562$p$ at the front end of the second electrode 93 have the same configuration, the following description will be made only of the protrusion 552$p$ as a representative protrusion in some cases.

The control performed by the control section 40 on the discharge lamp driving section 230 will be described below. In the present embodiment, the control section 40 controls the discharge lamp driving section 230 based on combinations of the following four driving methods: the AC driving; the DC driving; the biased driving; and the low-frequency AC driving. In the present embodiment, the control section 40 can perform a rated drive pattern DWs, a first drive pattern DW1, and a second drive pattern DW2 as drive patterns that are the combinations of the four driving methods.

The control section 40 switches one of the drive patterns to another based on the drive power WD supplied to the discharge lamp 90 and an accumulated lighting time tt. The accumulated lighting time tt is the sum of times for each of which the discharge lamp 90 is on. That is, the accumulated lighting time tt is the lighting time of the discharge lamp 90 having been integrated since the discharge lamp 90 was turned on for the first time.

In the present embodiment, the drive power WD supplied to the discharge lamp 90 can be changed, for example, between the rated power Ws and first, drive power W1 lower than the rated power Ws. That is, the control section 40 can perform, as a drive mode, a rated mode in which the drive power WD is the rated power Ws and a low-power mode in which the drive power WD is the first drive power W1. The rated power Ws is 200 W and the first drive power W1 is 130 W by way of example.

Figure 7:
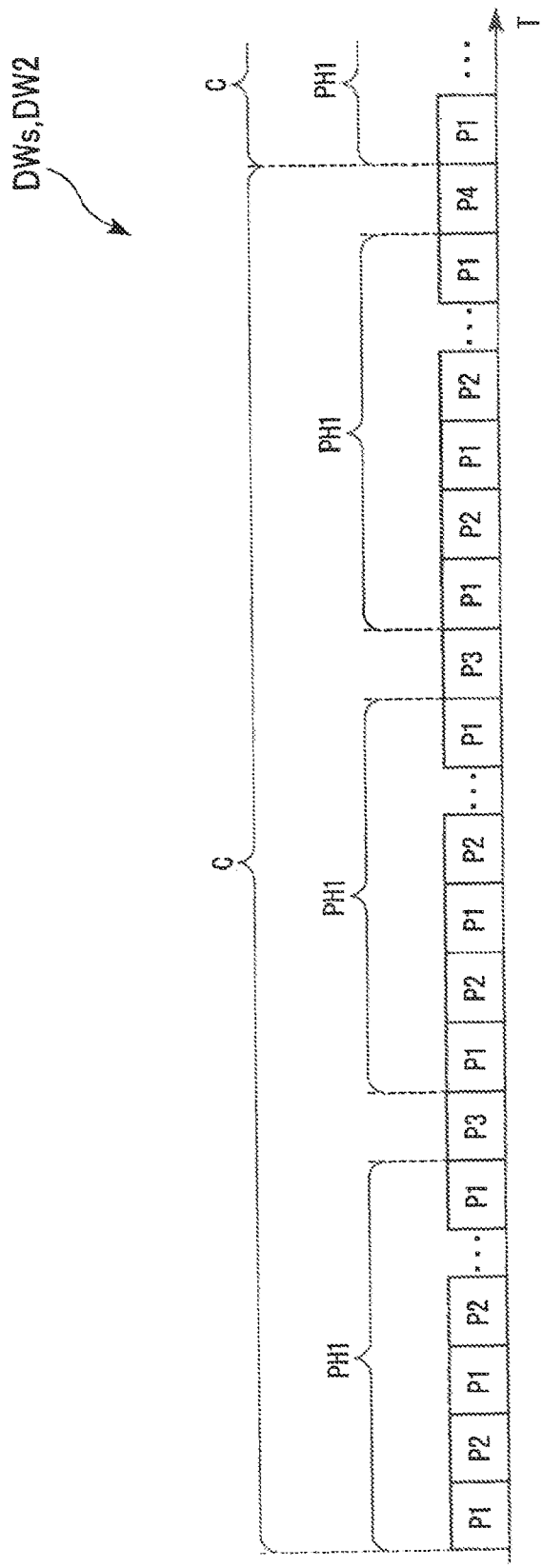
FIG. 7 is a diagrammatic view showing an example of changes in the period for which drive current is supplied to the discharge lamp in the present embodiment.

The drive patterns will each be described below. The rated drive pattern DWs will first be described. FIG. 7 is a diagrammatic view showing an example of changes in the period for which the drive current I is supplied to the discharge lamp 90 in the rated drive pattern DWs and the second drive pattern DW2 in the present embodiment. The horizontal axis in FIG. 7 represents time T.

In the rated drive pattern DWs in the present embodiment, a drive cycle C is repeated, as shown in FIG. 7. The drive cycles C each have first periods P1, second periods P2, third periods P3, and fourth periods P4. The drive cycles C are each provided with mixed periods PH1, in each of which the first period P1 and the second period P2 are alternately repeated. That is, the control section 40 alternately repeats the first period P1 and the second period P2 in the rated drive pattern DWs. The number of first periods P1 and the number of the second periods P2 in each of the mixed periods PH1 are not each limited to a specific value. In the example shown in FIG. 7, the drive cycles are each formed of three mixed periods PH1, two third periods P3, and one fourth period P4.

The first periods P1 are each a period in which the AC driving is performed. The second periods P2 are each a period in which the DC driving is performed. The third periods P3 are each a period in which the biased driving is performed. The fourth periods P4 are each a period in which the low-frequency AC driving is performed. As described above, the drive cycles C are each performed by the control section 48 that performs the four driving methods. The mixed periods PH1 are each a period in which the mixed driving is performed. The periods described above will each be described below in detail.

Figure 8:
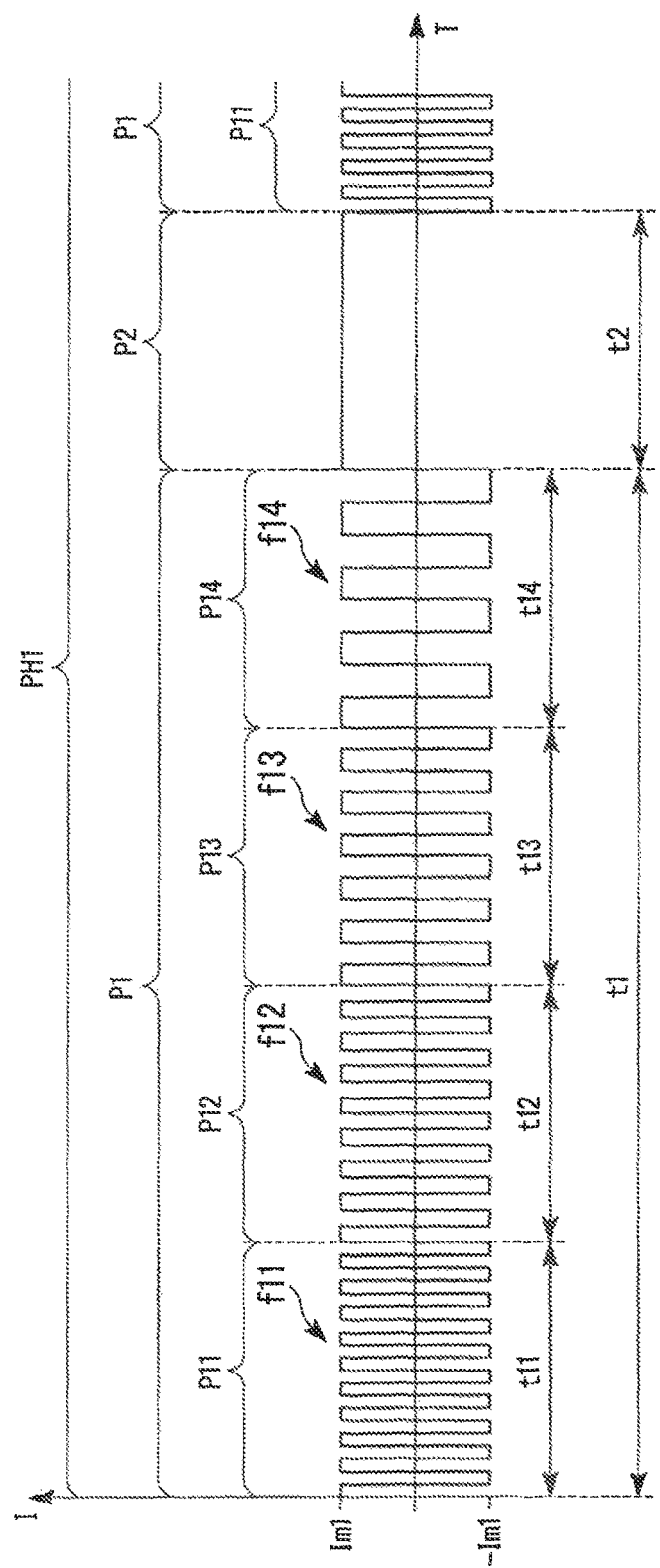
FIG. 8 shows an example of the waveform of the drive current in a mixed period in the present embodiment.

FIG. 8 shows an example of the waveform of the drive current in each of the mixed periods PH1. In FIG. 8, the vertical axis represents the drive current I, and the horizontal axis represents the time T. The drive current I is so shown as to be positive in the first polarity state and negative in the second polarity state.

The first periods P1 are each a period in which AC current having a first frequency (frequency) f1 is supplied to the discharge lamp 90. In the present embodiment, the first periods P1 each have a first AC period P11, a second AC period P12, a third AC period P13, and a fourth AC period P14. The first AC period P11, the second AC period P12, the third AC period P13, and the fourth AC period P14 are successively provided in this order.

In the present embodiment, the AC current in each of the first AC period P11, the second AC period P12, the third AC period P13, and the fourth AC period P14 is, for example, rectangular-wave AC current the polarity of which is so inverted multiple times that the current value changes between Im1 and −Im1.

A first frequency f11 in the first AC period P11, a first frequency f12 in the second AC period P12, a first frequency f13 in the third AC period P13, and a first frequency f14 in the fourth AC period P14 differ from one another. That is, in the present embodiment, the first frequencies f1 contain a plurality of frequencies different from one another, and the first AC periods P1 each have a plurality of AC periods in which the frequencies of the AC current supplied to the discharge lamp 90 differ from one another.

The first frequency f11, the first, frequency f12, the first frequency f13, and the first frequency f14 are listed in the descending order. That is, in each of the first periods P1, the AC current in a temporally later AC period has a lower frequency.

In the present embodiment, the start polarity of each of the first periods P1 is, for example, opposite the end polarity of the period provided immediately before the first period P1. The start, polarity is the polarity of the drive current I at the point of time when a certain period starts. The end polarity is the polarity of the drive current I at the point of time when a certain period ends.

Specifically, for example, in a case where the polarity of the DC current supplied to the discharge lamp 90 in the second period P2 provided immediately before a first period P1 is the second polarity, the end polarity of the second period P2 is the second polarity, and the start polarity of the first period P1 is therefore the first polarity. Further, for example, in a case where the end polarity in the third period P3 or the fourth period P4 immediately before a first period P1 is the first polarity, the start polarity of the first period P1 is the second polarity. In the present embodiment, the start polarity of each of the first periods P1 is the start polarity of the first AC period P11.

In the present embodiment, the length t11 of the first AC period P11, the length t12 of the second AC period P12, the length t13 of the third AC period P13, and the length t14 of the fourth AC period P14 are, for example, equal to one another.

The second periods P2 are each a period in which DC current is supplied to the discharge lamp 90. In the example shown in FIG. 8, in each of the second periods P2, the first-polarity drive current I having the fixed current value Im1 is supplied to the discharge lamp 90. Whenever a second period P2 is provided in each of the mixed periods PH1, the polarity of the DC current supplied to the discharge lamp 90 in the second period P2 is inverted.

That is, in each of the mixed periods PH1 shown in FIG. 7, the polarity of the DC current in the second period P2 provided immediately before a first period P1 differs from the polarity of the DC current in the second period P2 provided immediately after the first period P1. For example, in a case where the polarity of the DC current in the second period P2 provided immediately before a first period P1 is the first polarity, as the polarity of the DC current in each of the second periods P2 shown in FIG. 8, the polarity of the DC current in the second period P2 provided immediately after the first period P1 is the second polarity opposite the first polarity. In this case, in the second period P2 provided immediately after the first period P1, the second-polarity drive current I having the fixed current value −Im1 is supplied to the discharge lamp 98. The length t2 of each of the second periods P2 shown in FIG. 8 is greater than the length of the half cycle of the AC current having the first frequency f11 in each of the first periods P1.

The third periods P3 are each provided between mixed periods PH1 temporally adjacent to each other, as shown in FIG. 7. The third periods P3 are each provided, for example, immediately after a first period P1. The third periods P3 are each provided, for example, immediately before a first period P1. That is, the third periods P3 are each so provided, for example, as to be sandwiched between first periods P1.

Figure 9:
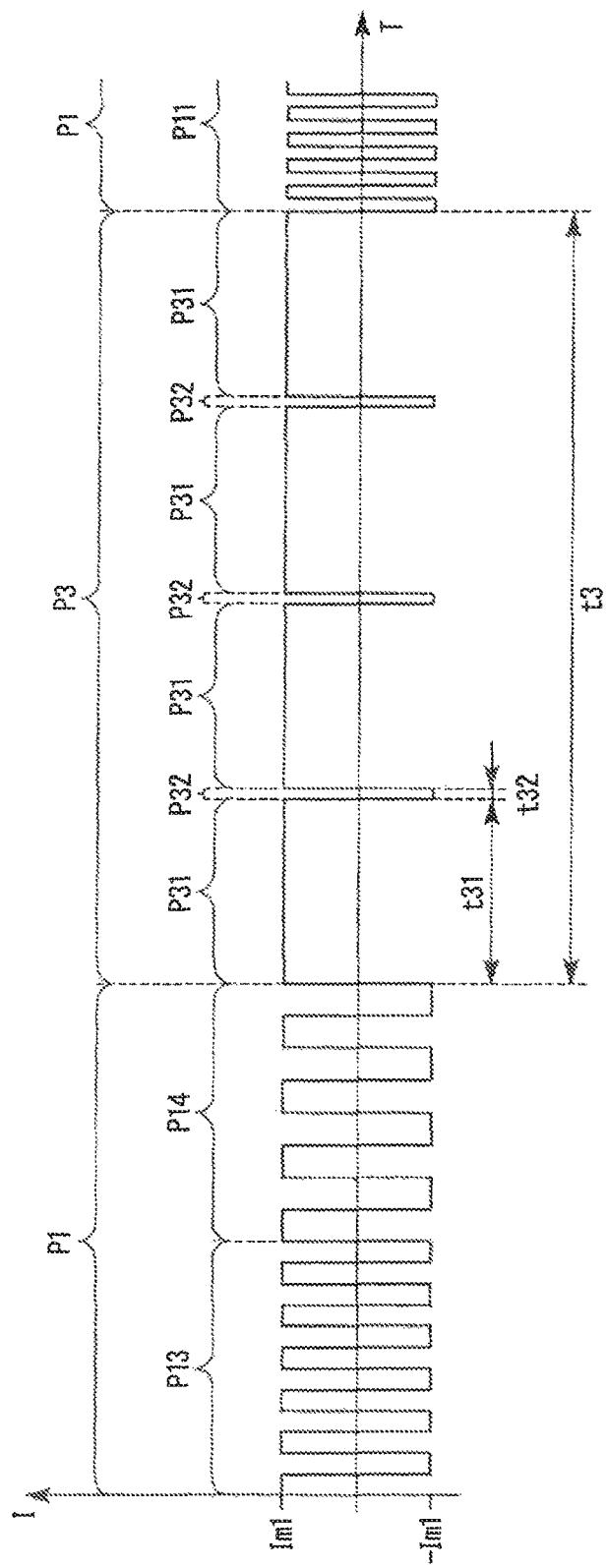
FIG. 9 shows an example of the waveform of the drive current in a third period in the present embodiment.

FIG. 9 shows an example of the waveform of the drive current in each of the third periods P3. In FIG. 9, the vertical axis represents the drive current I, and the horizontal axis represents the time T. The drive current I is so shown as to be positive in the first polarity state and negative in the second polarity state.

The third periods DC3 are each a period alternately containing a first DC period P31 and a second DC period P32. The first DC periods P31 are each a period in which DC current is supplied to the discharge lamp 90. In the example shown in FIG. 9, in each of the first DC periods P31, the first-polarity drive current I having the fixed current value Im1 is supplied to the discharge lamp 90.

The second DC periods P32 are each a period in which DC current having the polarity opposite the polarity of the DC current supplied to the discharge lamp 90 in the first DC periods P31 is supplied to the discharge lamp 90. That is, in the example shown in FIG. 9, in each of the second DC periods P32, the second-polarity drive current I having the fixed current value −Im1 is supplied to the discharge lamp 90.

Whenever a third period P3 is provided, the polarity of the DC current supplied to the discharge lamp 90 in each of the first DC periods P31 and the polarity of the DC current supplied to the discharge lamp 90 in each of the second DC periods P32 are inverted. That is, in the third period P3 provided after the first period P3 shown in FIG. 9, the polarity of the DC current supplied to the discharge lamp 90 in the first DC periods P31 is the second polarity, and the polarity of the DC current supplied to the discharge lamp 90 in the second DC periods P32 is the first polarity.

The length t31 of each of the first DC periods P31 is greater than the length t32 of each of the second DC periods P32. The length t31 of each of the first DC periods P31 is, for example, at least 10 times the length t32 of each of the second DC periods P32. Setting the length t31 of each of the first DC periods P31 as described above allows one of the electrodes to be heated in a preferable manner and prevents the temperature of the other electrode from excessively decreasing in a preferable manner in the third periods P3.

The length t31 of each of the first DC periods P31 is, for example, longer than or equal to 5.0 ms (milliseconds) but shorter than or equal to 20 ms (milliseconds). The length t32 of each of the second DC periods P32 is shorter than 0.5 ms (milliseconds).

The total length t31 of the first DC periods P31 in the third periods P3 is greater than the length t2 of each of the second periods P2 and greater than the length of the half cycle of the AC current in the fourth periods P4, which will be described later, that is, the AC current having a second frequency f2. The total length t31 of the first DC periods P31 in each of the third periods P3 is the sum of the lengths t31 of all the first DC period P31 contained in each of the third periods P3. In the example shown in FIG. 9, the third periods P3 each contain four first DC periods P31. The total length t31 of the first DC periods P31 in each of the third periods P3 is the sum of the lengths t31 of the four first DC periods P31.

The total length t31 of the first DC periods P31 in each of the third periods P3 is, for example, longer than or equal to 10 ms (milliseconds) but shorter than or equal to 1.0 s (seconds). Setting the total length t31 of the first DC periods P31 in each of the third periods P3 as described above allows a preferably large thermal load to be applied to the protrusion 552p of the first electrode 92. The lengths t31 of the first DC periods P31 may be equal to one another or may differ from one another. In the example shown in FIG. 9, the lengths t32 of the first DC periods P31 are equal to one another. In the following description, the total length t31 of the first DC periods P31 in each of the third periods P3 is simply called the total length of the first DC periods P31 in some cases.

The number of first DC periods P31 contained in each of the third periods P3 is determined based, for example, on the total length of the first DC periods P31. The number of first DC periods P31 is so determined that a set total length of the first DC periods P31 is achieved with the length t31 of each of the first DC periods P31 maximized to the extent that the length t31 of each of the first DC periods P31 is smaller than or equal to a predetermined value. That is, the number of first DC periods P31 contained in each of the third periods P3 increases, for example, as the total length of the first DC periods P3 increases.

Specifically, in a case where the predetermined value is set, for example, at 10 ms (milliseconds), and the total length of the first DC periods P31 is longer than 10 ms (milliseconds) but shorter than or equal to 20 ms (milliseconds), the number of first DC periods P31 contained in each of the third periods P3 is two. In a case where the total length of the first DC periods P31 is longer than 20 ms (milliseconds) but shorter than or equal to 30 ms (milliseconds), the number of first DC periods P31 contained in each of the third periods P3 is three.

In the example shown in FIG. 9, the number of first DC periods P31 contained in each of the third periods P3 is four. That is, for example, in the case where the predetermined value is set at 10 ms (milliseconds), the total length of the first DC periods P31 is longer than 30 ms (milliseconds) but shorter than or equal to 40 ms (milliseconds).

The setting described above allows the set total length of the first DC periods P31 to be achieved with the length t31 of each of the first DC periods P31 smaller than or equal to the predetermined value (10 ms).

In the present embodiment, the fourth periods P4 are each provided between mixed periods PH1 temporally adjacent to each other, as shown in FIG. 7. The fourth periods P4 are each provided, for example, immediately after a first period P1. The fourth periods P4 are each provided, for example, immediately before a first period P1. That is, the fourth periods P4 are each so provided, for example, as to be sandwiched between first periods P1.

Figure 10:
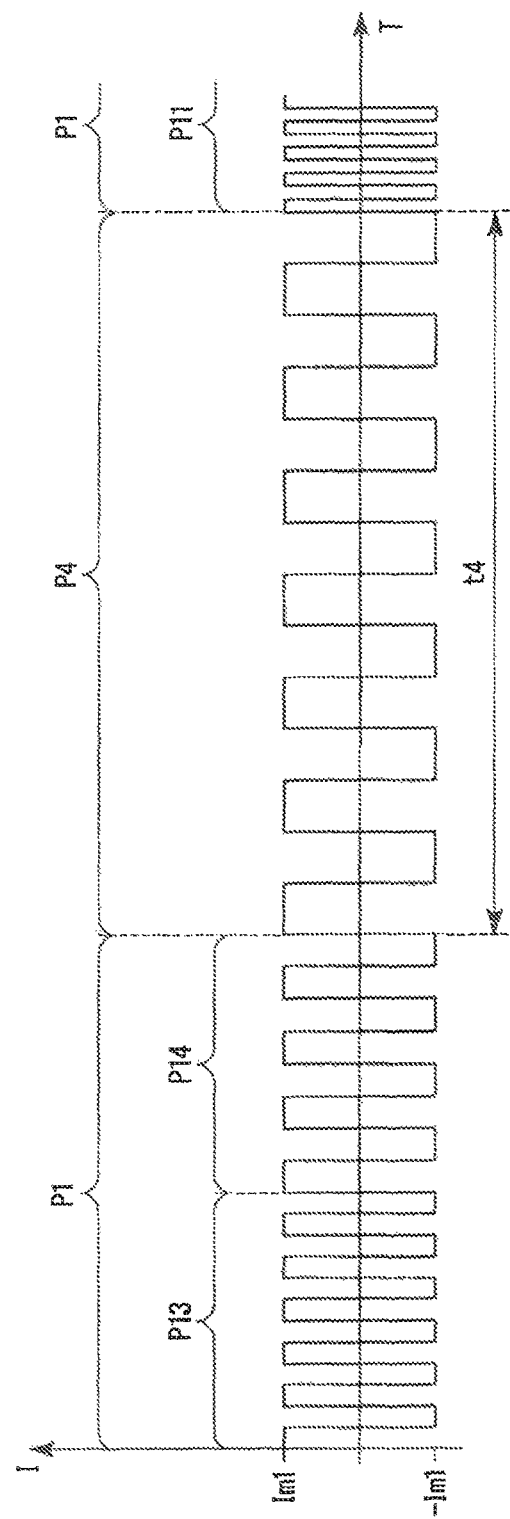
FIG. 10 shows an example of the waveform of the drive current in a fourth period in the present embodiment.

FIG. 10 shows an example of the waveform of the drive current in each of the fourth periods P4. In FIG. 10, the vertical axis represents the drive current I, and the horizontal axis represents the time T. The drive current I is so shown as to be positive in the first polarity state and negative in the second polarity state.

The fourth periods P4 are each a period in which AC current having the second frequency f2, which is lower than the first frequency f1 of the AC current supplied to the discharge lamp 90 in the first periods P1, is supplied to the discharge lamp 90, as shown in FIG. 10. That is, the second frequency f2 of the AC current in the fourth periods P4 is lower than any of the first frequencies f11 to f14. The value of the second frequency f2 is, for example, higher than or equal to 10 Hz but lower than or equal to 100 Hz.

Whenever a fourth period P4 is provided, the start polarity of the fourth period P4 is inverted. In the example shown in FIG. 10, the start polarity of the fourth period P4 is, for example, the first polarity. Therefore, in the fourth, period P4 provided after the fourth period P4 shown in FIG. 10, the start polarity is the second polarity.

The length t4 of each of the fourth periods P4 is, for example, greater than the length t2 of each of the second periods P2. The length t4 of each of the fourth periods P4 is, for example, greater than or equal to the length of six cycles of the AC current having the second frequency f2 but smaller than or equal to 30 cycles thereof. Setting the length t4 of each of the fourth periods P4 as described above allows preferable shaping of the protrusion 552p of the first electrode 92.

As described above, in the present embodiment, the third periods P3 and the fourth periods P4 are each provided between mixed periods PH1 temporally adjacent to each other. In the drive cycles C, the third periods P3 and the fourth periods P4 are periodically provided in a fixed pattern. Specifically, the control section 40 controls the discharge lamp driving section 230 in such a way that one of the third period P3 and the fourth period P4 is provided every first determined interval and the fourth period P4 is provided every second predetermined interval longer than the first predetermined interval. The first predetermined interval is, for example, 30 s (seconds), and the second predetermined interval is, for example, 90 s (seconds).

In the example shown in FIG. 7, after two third periods P3 are provided every 30 s (seconds), a fourth period P4 is provided. That is, two third periods P3 are provided after a fourth period P4 is provided but before another fourth period P4 is provided. Whenever a third period P3 is provided, the polarity of the DC current supplied to the discharge lamp 90 in the first DC period P31 and the polarity of the DC current supplied to the discharge lamp 90 in the second DC period P32 in the third period P3 are inverted. Therefore, in the two third periods P3 so provided as to be sandwiched between fourth periods P4 temporally adjacent to each other, the polarity of the drive current I supplied to the discharge lamp 90 in one of the two third periods P3 is opposite the polarity of the drive current I supplied to the discharge lamp 90 in the other third period P3.

That is, in the present embodiment, the control section 40 controls the discharge lamp driving section 230 in such a way that the following two third periods P3 are provided every second predetermined interval a fourth period P4 is provided; a third period P3 alternately containing the first DC period P31 in which the first-polarity DC current is supplied to the discharge lamp 90 and the second DC period P32 in which the second-polarity DC current is supplied to the discharge lamp 90; and a third period P3 alternately containing the first DC period P31 in which the second-polarity DC current is supplied to the discharge lamp 90 and the second DC period P32 in which the first-polarity DC current is supplied to the discharge lamp 90. In other words, the two third periods P3 described above are provided in the period sandwiched between fourth periods P4 temporally adjacent to each other.

Figure 11:
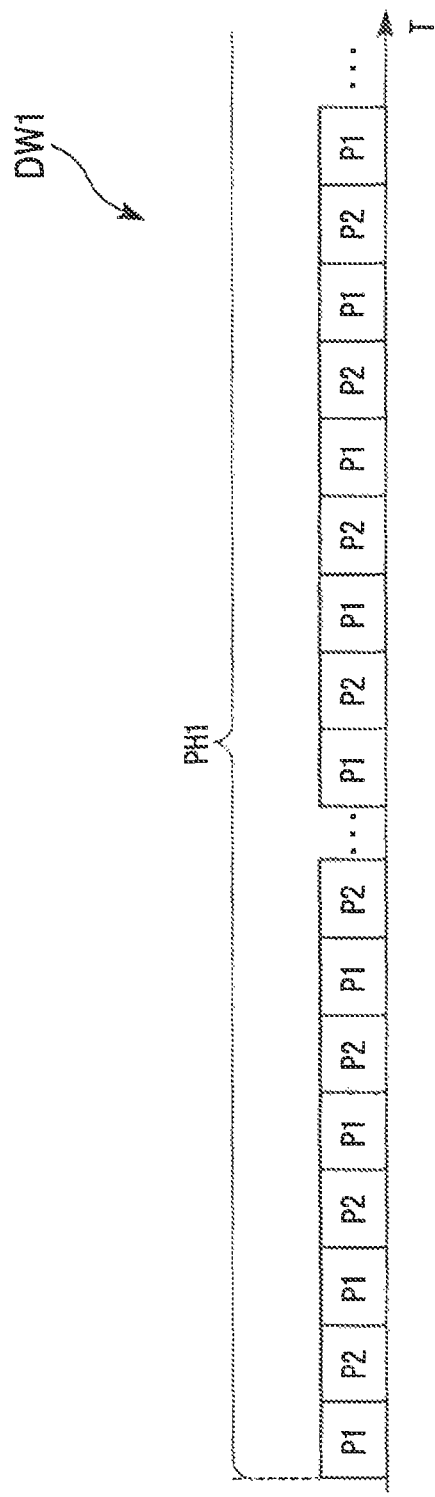
FIG. 11 is a diagrammatic view showing an example of changes in the period for which the drive current is supplied to the discharge lamp in the present embodiment.

The first drive pattern DW1 and the second drive pattern DW2 will next be described. FIG. 11 is a diagrammatic view showing an example of changes in the period for which the drive current I is supplied to the discharge lamp 90 in the first drive pattern DW1 in the present embodiment. The horizontal axis in FIG. 7 represents the time T. In the first drive pattern DW1 in the present embodiment, the first period P1 and the second period P2 described above are alternately repeated. That is, the control section 40 alternately repeats the first period P1 and the second period P2 in the first drive pattern DW1. In the first drive pattern DW1, no third period P3 or fourth period P4 is provided, unlike in the rated drive pattern DWs. In the second drive pattern DW2 in the present embodiment, the drive cycle C is repeated, as in the rated drive pattern DWs, as shown in FIG. 7. That is, the second drive pattern DW2 has the same waveform as that of the rated drive pattern DWs.

The length t1 of each of the first periods P1 in the rated drive pattern DWs, the length t1 in the first drive pattern DW1, and the length t1 in the second drive pattern DW2 differ from one another. The length t1 of each of the first periods P1 is the sum of the length t11 of the first AC period P11, the length t12 of the second AC period P12, the length t13 of the third AC period P13, and the length t14 of the fourth AC period P14.

The length t1 of each of the first periods P1 in the rated drive pattern DWs and the length t1 of each of the first periods P1 in the first drive pattern DW1 are each greater than the length t1 of each of the first periods P1 in the second drive pattern DW2. The length t1 of each of the first periods P1 in the first drive pattern DW1 is greater than the length t1 of each of the first periods P1 in the rated drive pattern DWs. That is, the length t1 of each of the first, periods P1 in the second drive pattern DW2, the length t1 of each of the first periods P1 in the rated drive pattern DWs, and the length t1 of each of the first periods P1 in the first drive pattern DW1 is listed in the ascending order.

The length t1 of each of the first periods P1 in the second drive pattern DW2 is, for example, longer than or equal to 10 ms (milliseconds) but shorter than or equal to 5 s (seconds). The length t1 of each of the first periods P1 in the rated drive pattern DWs is, for example, longer than 30 ms (milliseconds) but shorter than 6 s (seconds). The length t1 of each of the first periods P1 in the first drive pattern DW1 is, for example, longer than or equal to 2 s (seconds) but shorter than or equal to 10 s (seconds).

The first frequency f1, which is the frequency of the AC current in the first periods P1, in the rated drive pattern DWs, the first frequency f1 in the first drive pattern DW1, and the first frequency f1 in the second drive pattern DW2 differ from one another. The first frequency f1 of the AC current in the first periods P1 in the first drive pattern DW1 and the first frequency f1 of the AC current in the first periods P1 in the second drive pattern DW2 are each higher than the first frequency f1 of the AC current in the first periods P1 in the rated drive pattern DWs. The first frequency f1 of the AC current in the first periods P1 in the first drive pattern DW1 is higher than the first frequency f1 of the AC current in the first periods P1 in the second drive pattern DW2.

That is, the first frequency f1 of the AC current in the first periods P1 in the rated drive pattern DWs, the first frequency f1 of the AC current in the first periods P1 in the second drive pattern DW2, and the first frequency f1 of the AC current in the first periods P1 in the first drive pattern DW are listed in the ascending order.

The first frequency f1 of the AC current in the first periods P1 in the rated drive pattern DWs is, for example, lower than or equal to 350 Hz. The first frequency f1 of the AC current in the first periods P1 in the second drive pattern DWs is, for example, higher than 300 Hz but lower than 500 Hz. The first frequency f1 of the AC current in the first periods P1 in the first drive pattern DW1 is higher than or equal to 400 Hz. The first frequency f1 of the AC current in the first periods P1 in the first drive pattern DW1 may be higher than or equal to 1 kHz.

In the present specification, the state in which the first frequency f1 of the AC current in the first periods P1 is high includes a state in which the average frequency of the AC current in each of the first periods P1 is high. That is, for example, as long as the average frequency of the AC current in each of the first periods P1 in the first, drive pattern DW1 is higher than the average frequency of the AC current in each of the first periods P1 in the second drive pattern DW2, part of the plurality of frequencies f1 of the AC current in each of the first periods P1 in the first drive pattern DW1 may be lower than at least of one of the plurality of frequencies f1 of the AC current in each of the first periods P1 in the second drive pattern DW2.

In the rated drive pattern DWs and the second drive pattern DW2, the length t1 of each of the first periods P1 periodically changes. Specifically, in the rated drive pattern DWs and the second drive pattern DW2, the following periods are alternately provided: a period for which whenever a first period P1 is provided, the length t1 of the first period P1 gradually increases; and a period for which whenever a first period P1 is provided, the length t1 of the first period P1 gradually decreases. On the other hand, in the first drive pattern DW1, the length t1 of each of the first periods P1 is fixed.

The length t2 of each of the second periods P2 in the rated drive pattern DWs, the length t2 in the first drive pattern DW1, and the length t2 in the second drive pattern DW2 differ from one another. The length t2 of each of the second periods P2 in the rated drive pattern DWs and the length t2 of each of the second periods P2 in the first drive pattern DW1 are each smaller than the length t2 of each of the second periods P2 in the second drive pattern DW2. The length t2 of each of the second periods P2 in the first drive pattern DW1 is smaller than the length t2 of each of the second periods P2 in the rated drive pattern DWs.

That is, the length t2 of each of the second periods P2 in the second drive pattern DW2, the length t2 of each of the second periods P2 in the rated drive pattern DWs, and the length t2 of each of the second periods P2 in the first drive pattern DW1 are listed in the descending order.

The length t2 of each of the second periods P2 in the second drive pattern DW2 and the length t2 of each of the second periods P2 in the rated drive pattern DWs are each, for example, greater than or equal to 10 ms (milliseconds) but smaller than or equal to 30 ms (milliseconds). The length t2 of each of the second periods P2 in the first drive pattern DW1 is, for example, smaller than 10 ms (milliseconds).

In the rated drive pattern DWs and the second drive pattern DW2, the length t2 of each of the second periods P2 changes based on lamp voltage Vla. Specifically, in the rated drive pattern DWs and the second drive pattern DW2, the greater the lamp voltage Vla, the greater the length t2 of each of the second periods P2. On the other hand, in the first drive pattern DW1, the length t2 of each of the second periods P2 is fixed irrespective of the lamp voltage Vla.

Table 1 collectively snows an example of the drive patterns. The length t1 of the first period P1 in the rated drive pattern DWs and the length t1 of the first period P1 in the second drive pattern DW2 shown in Table 1 show the upper and lower limits of the periodically changing length t1. Further, the first frequency f1 in the first period P1 in each of the drive patterns shown in Table 1 shows the frequency range within which the plurality of first frequencies f1 are selected. The length t2 of the second period P2 in the rated drive pattern DWs and the length t2 of the second period P2 in the second drive pattern DW2 shown in Table 1 are each a value corresponding to an initial lamp voltage Vla.

S2), the control section 40 evaluates whether or not the accumulated lighting time tt is shorter than a predetermined time tt1 (step S4). The predetermined time tt1 is, for example, longer than or equal to about 8 h (hours) but shorter than or equal to about 30 h (hours). That is, the control section 40 evaluates whether or not the discharge lamp 90 is operating in the initial state based on whether or not the accumulated lighting time tt of the discharge lamp 90 is shorter than the predetermined time tt1. More specifically, the control section 40 determines that the discharge lamp 90 is operating in the initial state in the case where the accumulated lighting time tt of the discharge lamp 90 is shorter than the predetermined time tt1.

In the case where the accumulated lighting time tt is shorter than the predetermined time tt1 (YES in step 34), that is, in the case where the discharge lamp 90 is operating in the initial state, the control section 40 set the drive pattern to be the first drive pattern DW1 (step S5). On the other hand, in the case where the accumulated lighting time tt is longer than or equal to the predetermined time tt1 (NO in step S4), that is, in the case where the discharge lamp 90 is not operating in the initial state, the control section 40 set the drive pattern to be the second drive pattern DW2 (step S6). Having set the drive pattern to be the first drive pattern DW1 or the second drive pattern DW2, the control section 40

TABLE 1

|  | Length t1 of each of first periods P1 | First frequency f1 in first periods P1 | Length t2 of each of second periods P2 | Change in length t1 of each of first periods P1 | Change in length t2 of each of second periods P2 in accordance with lamp voltage Vla |
|---|---|---|---|---|---|
| Rated drive pattern DWs | Longer than or equal to 0.1 s but shorter than or equal to 1 s | Higher than or equal to 150 Hz but lower than or equal to 300 Hz | 10 ms | Yes | Yes |
| First drive pattern DW1 | 5 s | Higher than or equal to 575 Hz but lower than or equal to 680 Hz | 5 ms | No | No |
| Second drive pattern DW2 | Longer than or equal to 0.1 s but shorter than or equal to 0.5 s | Higher than or equal to 350 Hz but lower than or equal to 400 Hz | 15 ms | Yes | Yes |

Figure 12:
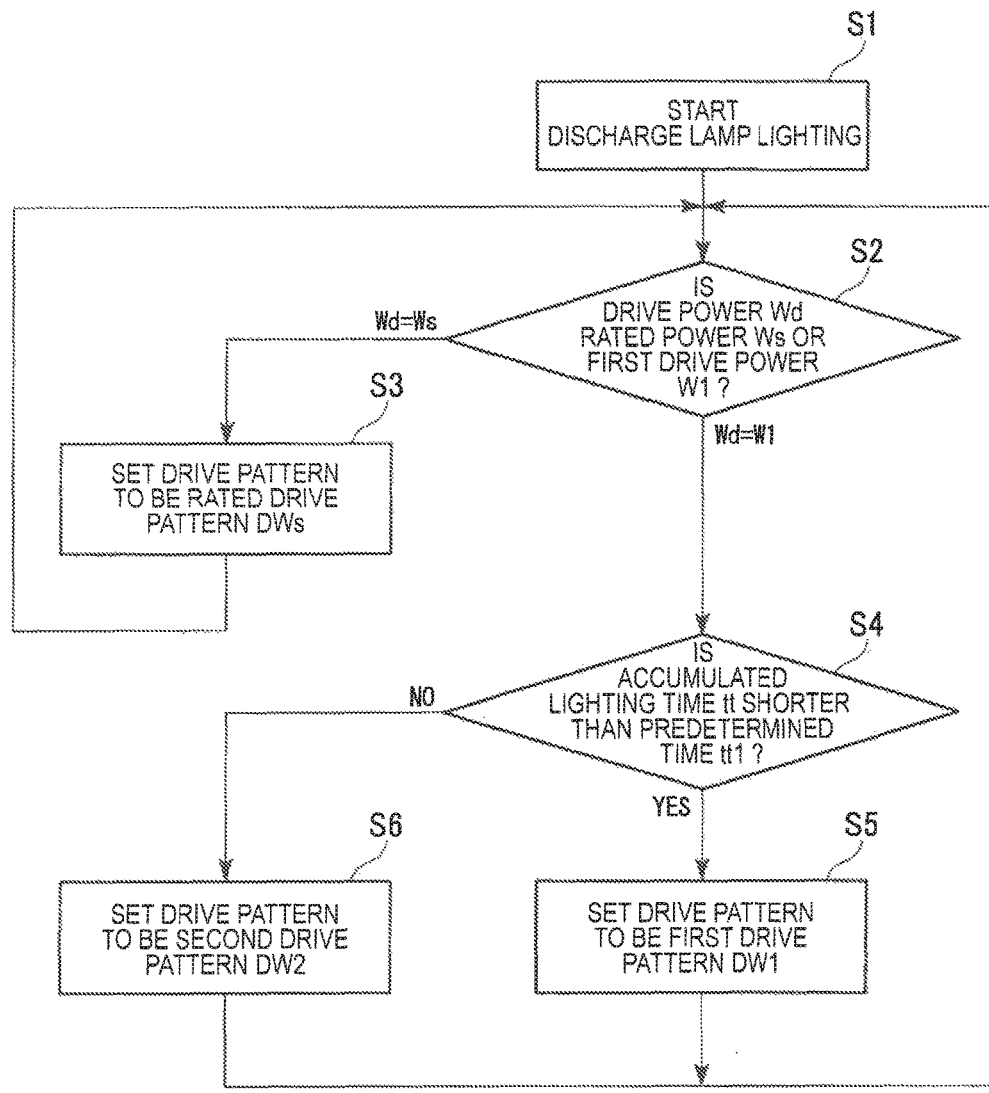
FIG. 12 is a flowchart showing an example of the procedure of control performed by the control section in the present embodiment.

How the control section 40 switches one of the drive patterns to another in the present embodiment will next be described. FIG. 12 is a flowchart showing an example of the procedure of the switching control performed by the control section 40 in the present embodiment. After the ignition of the discharge lamp 90 starts (step S1), the control section 40 evaluates whether the drive power Wd supplied to the discharge lamp 90 has been set at the rated power Ws or the first drive power W1, which is lower than the rated power Ws (step S2).

In the case where the drive power Wd has been set at the rated power Ws (Wd=Ws in step S2), the control section 40 sets the drive pattern to be the rated drive pattern DWs (step S3). On the other hand, in the case where the drive power Wd has been set at the first drive power W1 (Wd=W1 in step determines the set drive power Wd again (step S2) and sets the drive pattern, as described above. Table 2 collectively shows the aforementioned drive pattern switching performed by the control section 40 in the present embodiment.

TABLE 2

|  | Accumulated lighting time tt | |
|---|---|---|
| Drive power Wd | tt < tt1 | tt ≥ tt1 |
| Rated drive power Ws | Rated drive pattern DWs | |
| First drive power W1 | First drive pattern DW1 | Second drive pattern DW2 |

As described above, the control section 40 switches the drive pattern based on the drive power Wd and the accumulated lighting time tt to perform the following control: That is, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t1 of each of the first periods P1 to be longer than, the length t1 of each of the first periods P1 in the case where the first drive power W1 is supplied to the discharge lamp 90 and the accumulated lighting time tt is longer than or equal to the predetermined time tt1 (second drive pattern DW2) and sets the first frequency f1 of the AC current in the first periods P1 to be higher than the first frequency f1 of the AC current in the first periods P1 in the case where the first drive power W1 is supplied to the discharge lamp 90 and the accumulated lighting time tt is longer than or equal to the predetermined time tt1 (second drive pattern DW2).

Instead, in the present embodiment, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t1 of each of the first periods P1 at a fixed value. Still instead, in the present embodiment, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t2 of each of the second periods P2 to be shorter than the length t2 of each of the second periods P2 in the case where the first drive power W1 is supplied to the discharge lamp 90 and the accumulated lighting time tt is longer than or equal to the predetermined time tt1 (second drive pattern DW2).

Still instead, in the present embodiment, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t2 of each of the second periods P2 at a fixed value.

Still instead, in the present embodiment, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t1 of each of the first periods P1 to be longer than the length t1 of each of the first periods P1 in the case where the rated power Ws is supplied to the discharge lamp 90 (rated drive pattern DWs). Still instead, in the present embodiment, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), the control section 40 sets the length t2 of each of the second periods P2 to be shorter than the length t2 of each of the second periods P2 in the case where the rated power Ws is supplied to the discharge lamp 90 (rated drive pattern DWs).

The discharge lamp starter 10 including the control section 40 that performs the control described above can be implemented as a discharge lamp driving method. One aspect of the discharge lamp driving method according to the present embodiment is a discharge lamp driving method for supplying the discharge lamp 90 having the first electrode 32 and the second electrode 93 with the drive current I to drive the discharge lamp 90, the method including alternately repeating the first period P1, in which AC current is supplied to the discharge lamp 90, and the second period P2, in which DC current is supplied to the discharge lamp 90, in the case where the first drive power W1, which is lower than the rated power Ws of the discharge lamp 90, is supplied to the discharge lamp 90 and the accumulated lighting time tt of the discharge lamp 90 is shorter than the predetermined time tt1 (first drive pattern DW1), setting the length t1 of each of the first periods P1 to be longer than the length t1 of each of the first periods P1 in the case where the first drive power W1 is supplied to the discharge lamp 90 and the accumulated lighting time tt is longer than or equal to the predetermined time tt1 (second drive pattern DW2), and setting the first frequency f1 of the AC current in the first periods P1 to be higher than the first frequency f1 of the AC current in the first periods P1 in the case where the first drive power W1 is supplied to the discharge lamp 90 and the accumulated lighting time tt is longer than or equal to the predetermined time tt1 (second drive pattern DW2).

Figure 13:
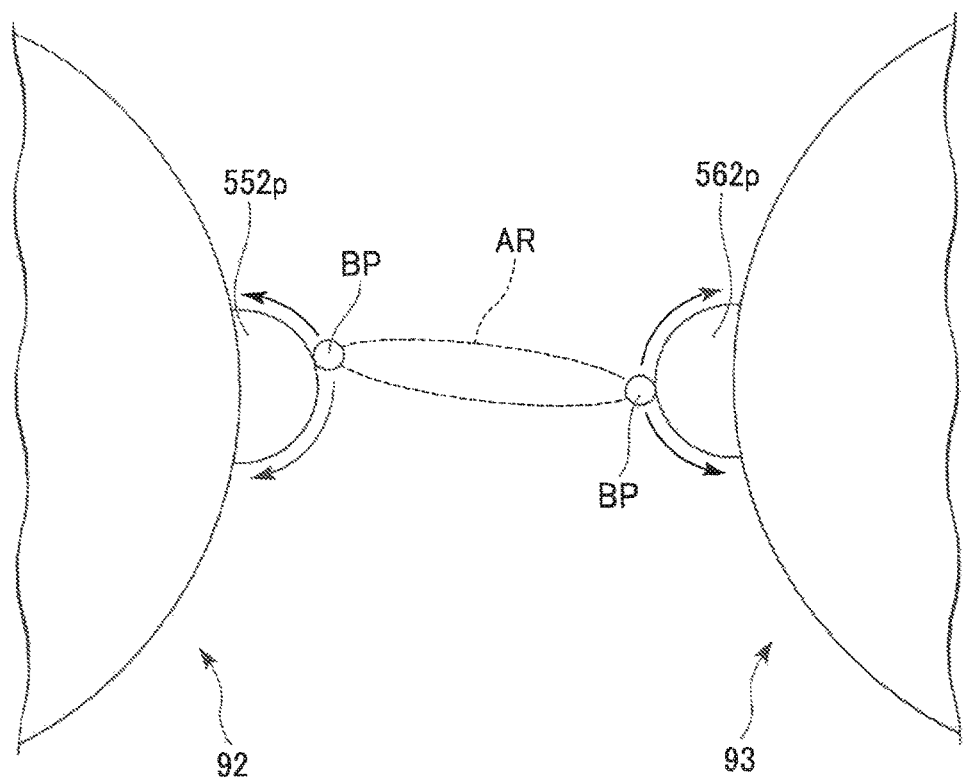
FIG. 13 shows an example of the protrusions at the front ends of the electrodes of the discharge lamp in its initial state.
Figure 14:
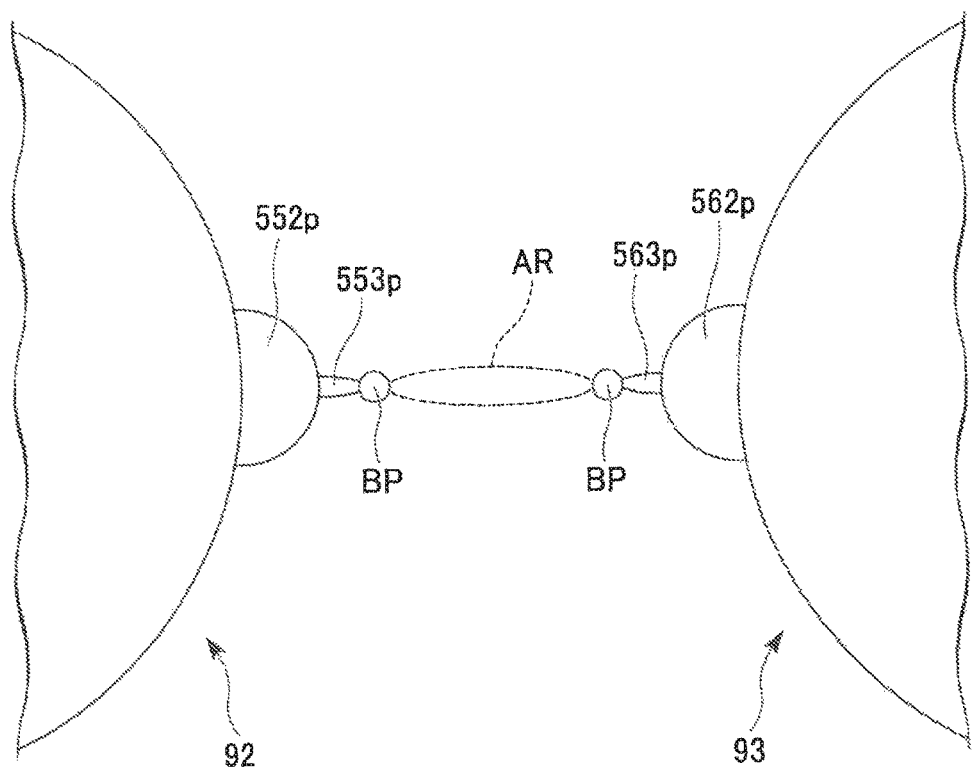
FIG. 14 shows an example of the protrusions at the front ends of the electrodes of the discharge lamp in a case where a first drive pattern in the present embodiment is performed.

FIG. 13 shows an example of the protrusions at the front ends of the electrodes of the discharge lamp 90 in the initial state. FIG. 14 shows an example of the protrusions at the front ends of the electrodes of the discharge lamp 90 in the case where the first drive pattern DW1 in the present embodiment is performed.

In the initial state of the discharge lamp 90, the protrusion 552p of the first electrode 92 and the protrusion 562p of the second electrode 93 are relatively large as compared with bright spots BP in arc discharge AR in the case of the first drive pattern DW1, as shown in FIG. 13. Therefore, in the initial state of the discharge lamp 90, provided that the drive power Wd is the first drive power W1, the bright spots BP are likely to move over the protrusions 552p and 562p, as indicated by the arrows in FIG. 13. When the bright spots BP move, the inter-electrode distance changes and the size of the arc discharge AR changes accordingly, resulting in a change in the illuminance of the discharge lamp 90 and flicker thereof in some cases.

In contrast, according to the present embodiment, the control section 40 increases the length t1 of each of the first periods P1 and the first frequency f1 of the AC current in the first periods P1 in the initial state, in which the drive power Wd is the first drive power W1 and the accumulated lighting time tt is shorter than the predetermined time tt1. The time period for which the polarity is kept fixed can be therefore shortened, whereby only part of the protrusions 552p and 562p is allowed to melt and solidify for growth with the positions of the bright spots BP stabilized. As a result, in the initial state of the discharge lamp 90, elongated small protrusions 553p and 563p can be quickly formed at the front ends of the protrusions 552p and 562p, as shown in FIG. 14. The formation of the small protrusions 553p and 563p allows the bright spots BP to be stabilized in the positions of the front ends of the small protrusions 553p and 563p, preventing the bright spots BP from moving. Therefore, according to the present embodiment, even in the case where the first drive power W1, which is lower than the rated power Ws, is supplied to the discharge lamp 90 in the initial state of the discharge lamp 90, the flicker of the discharge lamp 90 can be avoided. As a result, flicker of an image projected from the projector 500 can be avoided.

The first drive pattern DW1 applies a relatively small amount of thermal load to the first electrode 92 and the second electrode 93. Therefore, when the first drive pattern DW1 continues for at least the predetermined time tt1, the elongated small protrusions 553$p$ and 563$p$ are unlikely to be maintained, resulting, for example, in loss of the small protrusions 553$p$ and 563$p$ in some cases. The stable lighting state of the discharge lamp 90 cannot therefore be maintained in some cases.

In contrast, according to the present embodiment, the control section 40 shortens the length t1 of each of the first periods P1 and lowers the frequency f1 of the AC current in the first periods P1 in the case where the drive power Wd is the first drive power W1 and the accumulated lighting time tt is longer than or equal to the predetermined time tt1. That is, the control section 40 switches the drive pattern from the first drive pattern DW1 to the second drive pattern DW2 in the case where the drive power Wd is the first drive power W1 and the accumulated lighting time tt is longer than or equal to the predetermined time tt1. The second drive pattern DW2 applies a larger amount of thermal load to the first electrode 92 and the second electrode 93 than the first drive pattern DW1. The second drive pattern DW2 therefore causes the protrusions 552$p$ and 562$p$ to melt and solidify over a relatively wide range for growth, whereby middle-sized protrusions that are thicker, stabler than the small protrusions 553$p$ and 563$p$ are formed at the front ends of the protrusions 552$p$ and 562$p$. As a result, even when the accumulated lighting time tt is longer than or equal to the predetermined time tt1, the bright spots BP in the arc discharge AR can be stabilized, whereby the flicker of the discharge lamp 90 can be avoided.

In the case where the accumulated lighting time tt is shorter than the predetermined time tt1, switching the driver pattern to the second drive pattern DW2 is unlikely to allow formation of the middle-sized protrusions thicker and stabler than the small protrusions 553$p$ and 563$p$. The reason for this is that the protrusions 552$p$ and 562$p$ are unlikely to melt in the initial state and the middle-sized protrusions are unlikely to grow at the front ends of the protrusions 552$p$ and 562$p$ even when the second drive pattern DW2 is performed. Therefore, when the drive pattern is set from the initial state to be the second drive pattern DW2, it takes a long time to form the middle-sized protrusions that stabilize the bright spots BP at the front ends of the protrusions 552$p$ and 562$p$. Until the middle-sized protrusions are formed, the discharge lamp 90 is likely to flicker, resulting in an increase in the time period for which the discharge lamp 90 flickers. On the other hand, when the accumulated lighting time tt is longer than the predetermined time tt1, the protrusions 552$p$ and 562$p$ are likely to melt, and the relatively thick, stable middle-sized protrusions can be quickly formed by performing the second drive pattern DW2.

As described above, in the present embodiment, in the period during which the protrusions 552$p$ and 562$p$ are unlikely to melt, that is, in the period during which the accumulated lighting time tt is shorter than the predetermined time tt1, the first drive pattern DW1, which allows quick formation of the elongated small protrusions 553$p$ and 563$p$ even in the initial state, is performed. In the period during which the protrusions 552$p$ and 562$p$ are likely to melt, that is, in the period during which the accumulated lighting time tt is longer than or equal to the predetermined time tt1, the second drive pattern DW2, which allows formation of the middle-sized protrusions thicker and stabler than the small protrusions 553$p$ and 563$p$, is performed. In this case, since the protrusions 552$p$ and 562$p$ are likely to melt, the second drive pattern DW2 allows quick formation of the thick, stable middle-sized protrusions. As described above, according to the present embodiment, the drive pattern can be preferably switched from one to another in accordance with whether the protrusions 552$p$ and 562$p$ are likely to melt, whereby the small protrusions 553$p$ and 563$p$ or the middle-sized protrusions can be quickly formed in the initial state and the period after the predetermined time tt1 elapses, whereby the bright spots BP in the arc discharge AR can be stabilized. The flicker of the discharge lamp 90 can therefore be preferably avoided.

Larger first electrode 92 and the second electrode 93 are likely to allow a greater amount of improvement in the life of the discharge lamp 90. On the other hand, however, larger first electrode 92 and the second electrode 33 are unlikely to cause the protrusions 552$p$ and 562$p$ to melt in the initial state. Therefore, increasing the size of the first electrode 92 and the second electrode 93 to improve the life of the discharge lamp 90 tends to cause the flicker of the discharge lamp 90 in the initial state in some cases. In contrast, according to the present embodiment, the flicker of the discharge lamp 90 in the initial state can be avoided as described above, whereby the first electrode 92 and the second electrode 93 can be enlarged to improve the life of the discharge lamp 90 while avoiding the flicker.

Further, for example, if formation of small protrusions is only required, it is conceivable to provide only the first periods P1, in which AC current is supplied to the discharge lamp 90, in the first drive pattern DW1. In this case, however, the formed small protrusions could be undesirably too thin in some cases, which means that the protrusions could, for example, be lost before the accumulated lighting time tt reaches the predetermined time tt1. In contrast, according to the present embodiment, the second periods P2, in which DC current is supplied to the discharge lamp 90, are provided in addition to the first periods P1 in the first drive pattern DW1, whereby the small protrusions 553$p$ and 563$p$ can be formed with an adequate thermal load applied to the first electrode 92 and the second electrode 93. As a result, the situation in which the formed small protrusions 553$p$ and 563$p$ are too thin can be avoided, whereby the bright spots BP in the arc discharge AR can be stabilized and the flicker can therefore be avoided until the accumulated lighting time tt reaches the predetermined time tt1.

Further, according to the present embodiment, the control section 40 sets the length t1 of each of the first periods P1 to be fixed when the first drive pattern DW1 is performed. The range over which the protrusions 552$p$ and 562$p$ melt is likely to narrow as compared with a case where the length t1 of each of the first periods P1 changes, whereby the small protrusions 553$p$ and 563$p$ are likely to be formed more quickly. The flicker of the discharge lamp 90 can therefore be more preferably avoided.

Further, according to the present embodiment, in the case where the first drive pattern DW1 is performed, the control section 40 sets the length t2 of each of the second periods P2 to be shorter than the length t2 of each of the second periods P2 in the case where the second drive pattern DW2 is performed. The thermal load applied to the first electrode 92 and the second electrode 93 can therefore be adequately reduced, whereby the range over which the protrusions 552$p$ and 562$p$ melt can be narrowed. The small protrusions 553$p$ and 563$p$ are therefore likely to be formed more quickly. The flicker of the discharge lamp 90 can therefore be more preferably avoided.

Further, according to the present embodiment, the control section 40 sets the length t2 of each of the second periods P2 to be fixed in the case where the first drive pattern DW1 is performed. The range over which the protrusions 552p and 562p melt are therefore likely to narrow as compared with a case where the length t2 of each of the second periods P2 changes, whereby the small protrusions 553p and 563p are likely to be formed more quickly. The flicker of the discharge lamp 90 can therefore be more preferably avoided.

Further, according to the present embodiment, in the case where the first drive pattern DW1 is performed, the control section 40 sets the length t1 of each of the first periods P1 to be longer than the length t1 of each of the first periods P1 in the case where the rated drive pattern DWs is performed. Therefore, in the first drive pattern DW1, the bright spots BP are likely to be more stabilized, and the small protrusions 553p and 563p are likely to be formed quickly. The flicker of the discharge lamp 90 can therefore be more preferably avoided.

Further, according to the present embodiment, in the case where the first drive pattern DW1 is performed, the control section 40 sets the length t2 of each of the second periods P2 to be smaller than the length t2 of each of the second periods P2 in the case where the rated drive pattern DWs is performed. The thermal load applied to the first electrode 92 and the second electrode 93 can therefore be adequately reduced, whereby the range over which the protrusions 552p and 562p melt can be narrowed. As a result, the small protrusions 553p and 563p are likely to be formed more quickly, whereby the flicker of the discharge lamp 90 can be more preferably avoided.

In the present embodiment, the following configurations and methods can be employed.

In the first drive pattern DW1, the third periods P3 may be provided. In this case, when the first drive pattern DW1 is performed, the control section 40 preferably sets the length t3 of each of the third periods P3 to be shorter than the length t3 of each of the third periods P3 in the case where the second drive pattern DW2 is performed. The reason for this is that the setting described above is likely to allow the thermal load applied to the first electrode 92 and the second electrode 93 to be adequately reduced in the first drive pattern DW1.

Further, in the first drive pattern DW1, the fourth periods P4 may be provided. In this case, when the first drive pattern DW1 is performed, the control section 40 preferably sets the length t4 of each of the fourth periods P4 to be shorter than the length t4 of each of the fourth periods P4 in the case where the second drive pattern DW2 is performed. The reason for this is that the setting described above is likely to allow the thermal load applied to the first electrode 92 and the second electrode 93 to be adequately reduced in the first drive pattern DW1.

Further, in the first drive pattern DW1, the third periods P3 and the fourth periods P4 may both be provided. In this case, the first drive pattern DW1 may be a drive pattern having the same waveform of the rated drive pattern DWs and the second drive pattern DW2. Also in this case, the length t3 of each of the third periods P3 and the length t4 of each of the fourth periods P4 are preferably smaller than those in the second drive pattern DW2 from the reason described above.

In each of the drive patterns, the number of first frequencies f1 of the AC current in the first periods P1 is not limited to a specific number and may be fewer than or equal to three or greater than or equal to five. Further, in the drive patterns, the numbers of first frequencies f1 of the AC current in the first periods P1 may differ from one another, any one of the numbers may differ from the others, or the numbers may be equal to one another. That is, for example, the number of first frequencies f1 of the AC current in the first periods P1 in the first drive pattern DW1 may differ from the number of first frequencies f1 of the AC current in the first periods P1 in the second drive pattern DW2.

The length t1 of each of the first periods P1 in the first drive pattern DW1 only needs to be greater than the length t1 of each of the first periods P1 in the second drive pattern DW2 and may be smaller than or equal to the length t1 of each of the first periods P1 in the rated drive pattern DWs. Further, the frequency f1 of the AC current in the first periods P1 in the first drive pattern DW1 only needs to be higher than the frequency f1 of the AC current in the first periods P1 in the second drive pattern DW2 and may be lower than or equal to the frequency f1 of the AC current in the first periods P1 in the rated drive pattern DWs.

In the first drive pattern DW1, the length t1 of each of the first periods P1 may change. In this case, for example, the length t1 of each of the first periods P1 in the first drive pattern DW1 may periodically change, as in the rated drive pattern DWs and the second drive pattern DW2. Further, the length t2 of each of the second periods P2 in the first drive pattern DW1 may be greater than or equal to the length t2 of each of the second periods P2 in the rated drive pattern DWs and may be greater than or equal to the length t2 of each of the second periods P2 in the second drive pattern DW2. Further, in the first drive pattern DW1, the length t2 of each of the second periods P2 may change. In this case, for example, the length t2 of each of the second periods P2 in the first drive pattern DW1 may change based on the lamp voltage Vla, as in the rated drive pattern DWs and the second drive pattern DW2.

In the embodiment described above, the description has been made with reference to the case where the invention is applied to a transmission-type projector, and the invention is also applicable to a reflection-type projector. The term "transmission-type" means that the liquid crystal light valves each including a liquid crystal panel or any other component are of light transmissive type. The term "reflection-type" means that the liquid crystal light valves are of light reflective type. Each of the light modulators is not limited, for example, to a liquid crystal panel and may, for example, be a light modulator using a micromirror.

In the embodiment described above, the projector 500 using the three liquid crystal panels 560R, 560G, and 560B (liquid crystal light valves 330R, 330G, and 330R) has been presented by way of example. The invention is also applicable to a projector using only one liquid crystal panel and a projector using four or more liquid crystal panels.

The configurations described above can be combined with one another to the extent that the combination causes no contradiction.

The entire disclosure of Japanese Patent Application No. 2017-041845, filed Mar. 6, 2017 is expressly incorporated by reference herein.

What is claimed is:
1. A discharge lamp driver comprising:
a discharge lamp driving section configured to supply drive current to a discharge lamp including a first electrode and a second electrode; and
a control section configured to control the discharge lamp driving section,
wherein the control section is configured to alternately repeat a first period in which an AC current is supplied to the discharge lamp and a second period in which a DC current is supplied to the discharge lamp, and wherein in a case where a first drive power lower than a rated power of the discharge lamp is supplied to the discharge lamp and an accumulated lighting time of the discharge lamp is shorter than a predetermined time, the control section is configured to set a length of the first period to be greater than the length of the first period in a case where the first drive power is supplied to the discharge lamp and the accumulated lighting time is equal to or longer than the predetermined time, and set a frequency of the AC current during the first period to be higher than the frequency of the AC current during the first period in the case where the first drive power is supplied to the discharge lamp and the accumulated lighting time is equal to or longer than the predetermined time.

2. The discharge lamp driver according to claim 1, wherein the control section sets the length of the first period to be a constant value, in the case where the first drive power is supplied to the discharge lamp and the accumulated lighting time is shorter than the predetermined time.

3. The discharge lamp driver according to claim 1, wherein in the case where the first drive power is supplied to the discharge lamp and the accumulated lighting time is shorter than the predetermined time, the control section sets a length of the second period to be shorter than the length of the second period in the case where the first drive power is supplied to the discharge lamp and the accumulated lighting time is equal to or longer than the predetermined time.

4. The discharge lamp driver according to claim 1, wherein the control section sets a length of the second period to be a constant value, in the case where the first drive power is supplied to the discharge lamp and the accumulated lighting time is shorter than the predetermined time.

5. The discharge lamp driver according to claim 1, wherein in the case where the first drive power is supplied to the discharge lamp and the accumulated lighting time is shorter than the predetermined time, the control section sets the length of the first period to be greater than the length of the first period in a case where the rated power is supplied to the discharge lamp.

6. The discharge lamp driver according to claim 1, wherein in the case where the first drive power is supplied to the discharge lamp and the accumulated lighting time is shorter than the predetermined time, the control section sets a length of the second period to be shorter than the length of the second period in a case where the rated power is supplied to the discharge lamp.

7. A projector comprising:
a discharge lamp configured to emit light;
the discharge lamp driver according to claim 1;
a light modulator configured to modulate the light emitted from the discharge lamp in accordance with an image signal; and
a projection system configured to project the light modulated by the light modulator.

8. A projector comprising:
a discharge lamp configured to emit light;
the discharge lamp driver according to claim 2;
a light modulator configured to modulate the light, emitted from the discharge lamp in accordance with an image signal; and
a projection system configured to project the light modulated by the light modulator.

9. A projector comprising:
a discharge lamp configured to emit light;
the discharge lamp driver according to claim 3;
a light modulator configured to modulate the light emitted from the discharge lamp in accordance with an image signal; and
a projection system configured to project the light modulated by the light modulator.

10. A projector comprising:
a discharge lamp configured to emit light;
the discharge lamp driver according to claim 4;
a light modulator configured to modulate the light emitted from the discharge lamp in accordance with an image signal; and
a projection system configured to project the light modulated by the light modulator.

11. A projector comprising:
a discharge lamp configured to emit light;
the discharge lamp driver according to claim 5;
a light modulator configured to modulate the light emitted from the discharge lamp in accordance with an image signal; and
a projection system configured to project the light modulated by the light modulator.

12. A projector comprising:
a discharge lamp configured to emit light;
the discharge lamp driver according to claim 6;
a light modulator configured to modulate the light emitted from the discharge lamp in accordance with an image signal; and
a projection system configured to project the light modulated by the light modulator.

13. A discharge lamp driving method for supplying drive current to a discharge lamp and driving the discharge lamp including a first electrode and a second electrode, the method comprising:
alternately repeating a first period in which an AC current is supplied to the discharge lamp and a second period in which a DC current is supplied to the discharge lamp; and in a case where a first drive power lower than a rated power of the discharge lamp is supplied to the discharge lamp and an accumulated lighting time of the discharge lamp is shorter than a predetermined time, setting a length of the first period to be greater than the length of the first period in a case where the first drive power is supplied to the discharge lamp and the accumulated lighting time is equal to or longer than the predetermined time, and setting a frequency of the AC current during the first period to be higher than the frequency of the AC current during the first period in the case where the first drive power is supplied to the discharge lamp and the accumulated lighting time is equal to or longer than the predetermined time.

* * * * *